US011233594B2

(12) United States Patent
Goel et al.

(10) Patent No.: US 11,233,594 B2
(45) Date of Patent: Jan. 25, 2022

(54) TIME SYNCHRONIZATION FOR WIRELESS COMMUNICATIONS

(71) Applicant: QUALCOMM Incorporated, San Diego, CA (US)

(72) Inventors: Satashu Goel, San Diego, CA (US); Junyi Li, Chester, NJ (US); Karl Georg Hampel, Hoboken, NJ (US); Peerapol Tinnakornsrisuphap, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/215,922

(22) Filed: Dec. 11, 2018

(65) Prior Publication Data
US 2019/0190635 A1 Jun. 20, 2019

Related U.S. Application Data

(60) Provisional application No. 62/615,282, filed on Jan. 9, 2018, provisional application No. 62/607,885, filed on Dec. 19, 2017.

(51) Int. Cl.
*H04J 3/06* (2006.01)
*H04W 56/00* (2009.01)
(Continued)

(52) U.S. Cl.
CPC .......... *H04J 3/0667* (2013.01); *H04J 3/0641* (2013.01); *H04J 3/0644* (2013.01);
(Continued)

(58) Field of Classification Search
CPC ... H04B 7/0413; H04B 7/0617; H04J 3/0641; H04J 3/0644; H04J 3/0667;
(Continued)

(56) References Cited

U.S. PATENT DOCUMENTS 8,897,447 B1 * 11/2014 Rohrweck ............. H04W 12/08
380/270
9,986,518 B2 5/2018 Wei et al.
2004/0008661 A1 * 1/2004 Myles ................... H04J 3/0664
370/350
2010/0049964 A1 * 2/2010 Kondapalli ......... H04L 63/0428
713/150
(Continued)

FOREIGN PATENT DOCUMENTS

CN 106604383 A 4/2017
EP 3032761 A1 6/2016
(Continued)

OTHER PUBLICATIONS

International Search Report and Written Opinion—PCT/US2018/065181—ISA/EPO—dated Apr. 12, 2019 (181271WO).

*Primary Examiner* — Kashif Siddiqui
(74) *Attorney, Agent, or Firm* — QUALCOMM Incorporated

(57) ABSTRACT

Methods, systems, and devices for wireless communications are described. A first node (e.g., a user equipment (UE)) may receive a timing synchronization signal from a second node (e.g., a base station) over a cellular wireless communication link. In some aspects, the timing synchronization signal may indicate mapping information to synchronize the first node with the second node. The mapping information may be for synchronizing a first time of a first clock of the first node to a second time of a second clock of a second node. The first node may synchronize the first time of the first clock to the second time of the second clock based at least in part on the mapping information and the synchronization information. The first node may transmit a timing control based on a timing of the second clock to a device connected to the first node via a local wired interface.

38 Claims, 23 Drawing Sheets

(51) Int. Cl.
  *H04W 72/04* (2009.01)
  *H04B 7/0413* (2017.01)
  *H04B 7/06* (2006.01)
(52) U.S. Cl.
  CPC ....... *H04W 56/001* (2013.01); *H04W 56/004* (2013.01); *H04W 56/0015* (2013.01); *H04W 56/0025* (2013.01); *H04W 72/0446* (2013.01); *H04W 72/0453* (2013.01); *H04B 7/0413* (2013.01); *H04B 7/0617* (2013.01)
(58) Field of Classification Search
  CPC ........... H04W 56/001; H04W 56/0015; H04W 56/0025; H04W 56/004; H04W 72/0446; H04W 72/0453
  See application file for complete search history.

(56) References Cited

U.S. PATENT DOCUMENTS

| | | | | |
|---|---|---|---|---|
| 2011/0150005 A1* | 6/2011 | Chen | ..................... | H04J 3/0667 |
| | | | | 370/503 |
| 2015/0092642 A1* | 4/2015 | Geboff | ................. | H04L 69/329 |
| | | | | 370/311 |
| 2016/0165558 A1* | 6/2016 | Kafle | ................. | H04L 65/4069 |
| | | | | 370/350 |
| 2017/0245228 A1 | 8/2017 | Ruffini et al. | | |

FOREIGN PATENT DOCUMENTS

| | | |
|---|---|---|
| WO | 2016004187 A1 | 1/2016 |
| WO | WO-2017054891 A1 | 4/2017 |
| WO | WO-2017063322 A1 | 4/2017 |

\* cited by examiner

TIME SYNCHRONIZATION FOR WIRELESS COMMUNICATIONS

CROSS REFERENCES

The present Application for Patent claims the benefit of U.S. Provisional Patent Application No. 62/607,885 by GOEL et al., entitled "TIME SYNCHRONIZATION OF A SECOND INTERFACE BASED ON INFORMATION RECEIVED OVER A FIRST INTERFACE," filed Dec. 19, 2017, and U.S. Provisional Patent Application No. 62/615,282 by HAMPEL et al., entitled "TECHNIQUES AND APPARATUSES FOR TIME-SYNCHRONIZATION FOR WIRELESS COMMUNICATIONS," filed Jan. 9, 2018, each of which is assigned to the assignee hereof and expressly incorporated by reference herein.

BACKGROUND

The following relates generally to wireless communication, and more specifically to time synchronization of a second interface based on information received over a first interface.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Local communication networks may include industrial machines, automated functions, and the like, which rely on strict timing synchronization (such as precision time protocol (PTP) or similar techniques) to ensure that the machines are synchronized for control and operations. Conventionally, timing synchronization may be implemented in such systems over an Ethernet network to synchronize the operations and movements of the machines. Implementation of timing synchronization may include dedicated hardware support for deterministic delay calculations (e.g., estimation of the round-trip delay of packets in the local communication network using an Ethernet switch, etc.). Such systems, however, do not conventionally rely on wireless communication systems for timing synchronization.

SUMMARY

The described techniques relate to improved methods, systems, devices, or apparatuses that support time synchronization for wireless communications. Generally, the described techniques provide for a dual-interface user equipment (UE) to provide timing information to control an end device, such as an industrial machine, automated function, and the like. For example, the UE may have a wireless interface that receives timing synchronization signals over a cellular wireless communication link, such as from a base station. The timing synchronization signals may be reference signal(s), synchronization signal(s), beam management signal(s), and the like. In some cases, the UE may be associated with a first clock with a first time and the synchronization signals may include a mapping for a second time of a second clock associated with a time synchronized wireless network (e.g., a clock associated with the base station). The UE may synchronize the first clock time to the second clock based on the mapping information within the synchronization signals.

The UE may receive the timing synchronization signals on the wireless interface and configure a timer function (e.g., associated with the first clock) on a local wired interface of the UE. Generally, the local wired interface may be any interface that connects the UE to an end device, such as the industrial machine. In some aspects, the UE functionality may be a part of the end device, e.g., the device may have built in cellular capabilities. The UE may provide timing control signals to the device via the local wired interface, where the timing control signals are based on the timer function of the local wired interface. In some aspects, the UE (or a controller function of the device that includes the UE functionality) controls the end device using the timing control signals. Thus, the UE may leverage cellular timing synchronization signals to provide timing and control of the end device, such as in an industrial machine.

A method of wireless communication, performed by a first node, of a time synchronized wireless network, associated with a first clock with a first time is described. The method may include receiving, from a second node of the time synchronized wireless network, a timing synchronization signal including mapping information identifying a mapping for a second time of a second clock of the second node to a frame structure of the time synchronized wireless network and synchronization information and synchronizing the first time of the first clock to the second time of the second clock based on the mapping information and the synchronization information.

An apparatus for wireless communication, performed by a first node, of a time synchronized wireless network, associated with a first clock with a first time is described. The apparatus may include a processor, memory in electronic communication with the processor, and instructions stored in the memory. The instructions may be executable by the processor to cause the apparatus to receive, from a second node of the time synchronized wireless network, a timing synchronization signal including mapping information identifying a mapping for a second time of a second clock of the second node to a frame structure of the time synchronized wireless network and synchronization information and synchronize the first time of the first clock to the second time of the second clock based on the mapping information and the synchronization information.

Another apparatus for wireless communication, performed by a first node, of a time synchronized wireless network, associated with a first clock with a first time is described. The apparatus may include means for receiving, from a second node of the time synchronized wireless network, a timing synchronization signal including mapping information identifying a mapping for a second time of a second clock of the second node to a frame structure of the time synchronized wireless network and synchronization information and synchronizing the first time of the first clock to the second time of the second clock based on the mapping information and the synchronization information.

A non-transitory computer-readable medium storing code for wireless communication, performed by a first node, of a time synchronized wireless network, associated with a first clock with a first time is described. The code may include instructions executable by a processor to receive, from a second node of the time synchronized wireless network, a timing synchronization signal including mapping information identifying a mapping for a second time of a second clock of the second node to a frame structure of the time synchronized wireless network and synchronization information and synchronize the first time of the first clock to the second time of the second clock based on the mapping information and the synchronization information.

Some examples of the method, apparatuses, and non-transitory computer-readable medium described herein may further include operations, features, means, or instructions for configuring a timer function of a local wired interface of the first node based on the timing synchronization signal, where the timing synchronization signal may be received over a cellular wireless communication link and transmitting a timing control signal to a device connected to the first node via the local wired interface, where the timing control signal may be based on the timer function.

Some examples of the method, apparatuses, and non-transitory computer-readable medium described herein may further include operations, features, means, or instructions for determining that at least one metric of the cellular wireless communication link satisfies a threshold and transmitting the timing control signal to control the device based on the determination.

In some examples of the method, apparatuses, and non-transitory computer-readable medium described herein, the at least one metric of the cellular wireless communication link may include operations, features, means, or instructions for a reference signal received power (RSRP), a SNR, a signal-to-interference-and-noise ratio (SINR), a reference signal received quality (RSRQ), a bandwidth parameter, a throughput parameter, or a combination thereof.

Some examples of the method, apparatuses, and non-transitory computer-readable medium described herein may further include operations, features, means, or instructions for determining that at least one metric of the cellular wireless communication link fails to satisfy a threshold and withholding the timing control signal from the device based on the determination.

Some examples of the method, apparatuses, and non-transitory computer-readable medium described herein may further include operations, features, means, or instructions for configuring the timer function as a precision time protocol (PTP) function, a generalized PTP function, or a timing and synchronization protocol function.

In some examples of the method, apparatuses, and non-transitory computer-readable medium described herein, the device may be an end device connected to the local wired interface and controlled by the first node.

In some examples of the method, apparatuses, and non-transitory computer-readable medium described herein, and receiving the timing synchronization signal from the second node using at least one of: a primary synchronization signal, a secondary synchronization signal, a system information block, a positioning reference signal, or any combination thereof.

In some examples of the method, apparatuses, and non-transitory computer-readable medium described herein, the synchronization information includes a timestamp identifier associated with a reference time and a delay identifier relating to an aggregated delay associated with the reference time.

In some examples of the method, apparatuses, and non-transitory computer-readable medium described herein, the synchronization information includes a protocol identifier relating to a time synchronization protocol used by the first node.

In some examples of the method, apparatuses, and non-transitory computer-readable medium described herein, the time synchronization protocol includes at least one of a PTP, a generalized PTP, or a timing and synchronization protocol.

Some examples of the method, apparatuses, and non-transitory computer-readable medium described herein may further include operations, features, means, or instructions for transmitting the mapping information and the synchronization information to a third node to synchronize a third time of a third clock of the third node to the second time of the second clock of the second node based on receiving the mapping information and the synchronization information.

In some examples of the method, apparatuses, and non-transitory computer-readable medium described herein, the mapping information and the synchronization information may be received on a downlink of a cellular link of the time synchronized wireless network or an uplink of the cellular link of the time synchronized wireless network.

In some examples of the method, apparatuses, and non-transitory computer-readable medium described herein, the mapping information identifies a time value for the first time and a frame structure identifier of at least one of a frame number, a hyper frame number, a system frame number, or a subframe number.

In some examples of the method, apparatuses, and non-transitory computer-readable medium described herein, the mapping information and the synchronization information may be received using a control channel of a cellular interface of the time synchronized wireless network.

In some examples of the method, apparatuses, and non-transitory computer-readable medium described herein, the control channel may be received using a control plane or a user plane of the cellular interface.

In some examples of the method, apparatuses, and non-transitory computer-readable medium described herein, the receiving includes receiving identification information and where the identification information includes at least one of a cellular link identifier, a node identifier, a cell identifier, a radio bearer identifier, a protocol data unit session identifier, or a protocol data unit connection identifier.

In some examples of the method, apparatuses, and non-transitory computer-readable medium described herein, the mapping information and the synchronization information relate to a first time synchronization instance of a set of time synchronization instances associated with the first node.

A method of wireless communication is described. The method may include receiving, by a UE, a timing synchronization signal from a base station over a cellular wireless communication link, configuring a timer function of a local wired interface of the UE based at least in part on the timing synchronization signal, and transmitting a timing control signal to a device connected to the UE via the local wired interface, where the timing control signal is based at least in part on the timer function.

An apparatus for wireless communication is described. The apparatus may include means for receiving, by a UE, a timing synchronization signal from a base station over a cellular wireless communication link, means for configuring a timer function of a local wired interface of the UE based at least in part on the timing synchronization signal, and means for transmitting a timing control signal to a device connected to the UE via the local wired interface, where the timing control signal is based at least in part on the timer function.

Another apparatus for wireless communication is described. The apparatus may include a processor, memory in electronic communication with the processor, and instructions stored in the memory. The instructions may be operable to cause the processor to receive, by a UE, a timing synchronization signal from a base station over a cellular wireless communication link, configure a timer function of a local wired interface of the UE based at least in part on the timing synchronization signal, and transmit a timing control signal to a device connected to the UE via the local wired interface, where the timing control signal is based at least in part on the timer function.

A non-transitory computer-readable medium for wireless communication is described. The non-transitory computer-readable medium may include instructions operable to cause a processor to receive, by a UE, a timing synchronization signal from a base station over a cellular wireless communication link, configure a timer function of a local wired interface of the UE based at least in part on the timing synchronization signal, and transmit a timing control signal to a device connected to the UE via the local wired interface, where the timing control signal is based at least in part on the timer function.

BRIEF DESCRIPTION OF THE DRAWINGS

FIGS. 6A through 8 show block diagrams of systems that support time synchronization for wireless communications in accordance with aspects of the present disclosure.

DETAILED DESCRIPTION

Wireless communication systems may include various reference signals, synchronization signals, and the like, that provide timing information to devices operating on the wireless network. Typically, these timing signals (timing synchronization signals) are used by the wireless devices to ensure frame/subframe boundary timing that supports uplink/downlink signals being received within the uplink/downlink frame, respectively. Therefore, the timing synchronization techniques are generally sufficient to allow for wireless communications. However, the timing synchronization techniques used in wireless communications may not be conventionally used to control timing (e.g., synchronization) of other devices (such as industrial devices) that are precisely time synchronized with each other.

Aspects of the disclosure are initially described in the context of a wireless communications system. Aspects of the present disclosure provide for implementation of timing control for a device, such as an industrial machine, from a dual-interface UE. The UE may receive timing synchronization signaling on a cellular interface and use the timing synchronization signals to configure a timer function on a local wired interface of the UE. In some cases, the UE may be associated with a first clock with a first time and the synchronization signals may include a mapping to a second time of a second clock associated with a time synchronized wireless network (e.g., a clock associated with the base station). The UE may synchronize the first clock time to the second clock based on the mapping information within the synchronization signals.

The local wired interface may connect the UE to an end device, such as an industrial machine. The timer function may provide timing control signals to the device over the local wired interface in order to control, at least in certain aspects, the device. Accordingly, the UE may use cellular-based timing synchronization signaling to configure timing control signals for an end device connected to the UE. In some aspects, the UE may transmit the timing control signals to the end device when the wireless channel performance supports a threshold degree of timing accuracy.

Aspects of the disclosure are further illustrated by and described with reference to apparatus diagrams, system diagrams, and flowcharts that relate to time synchronization for wireless communications.

Figure 1:
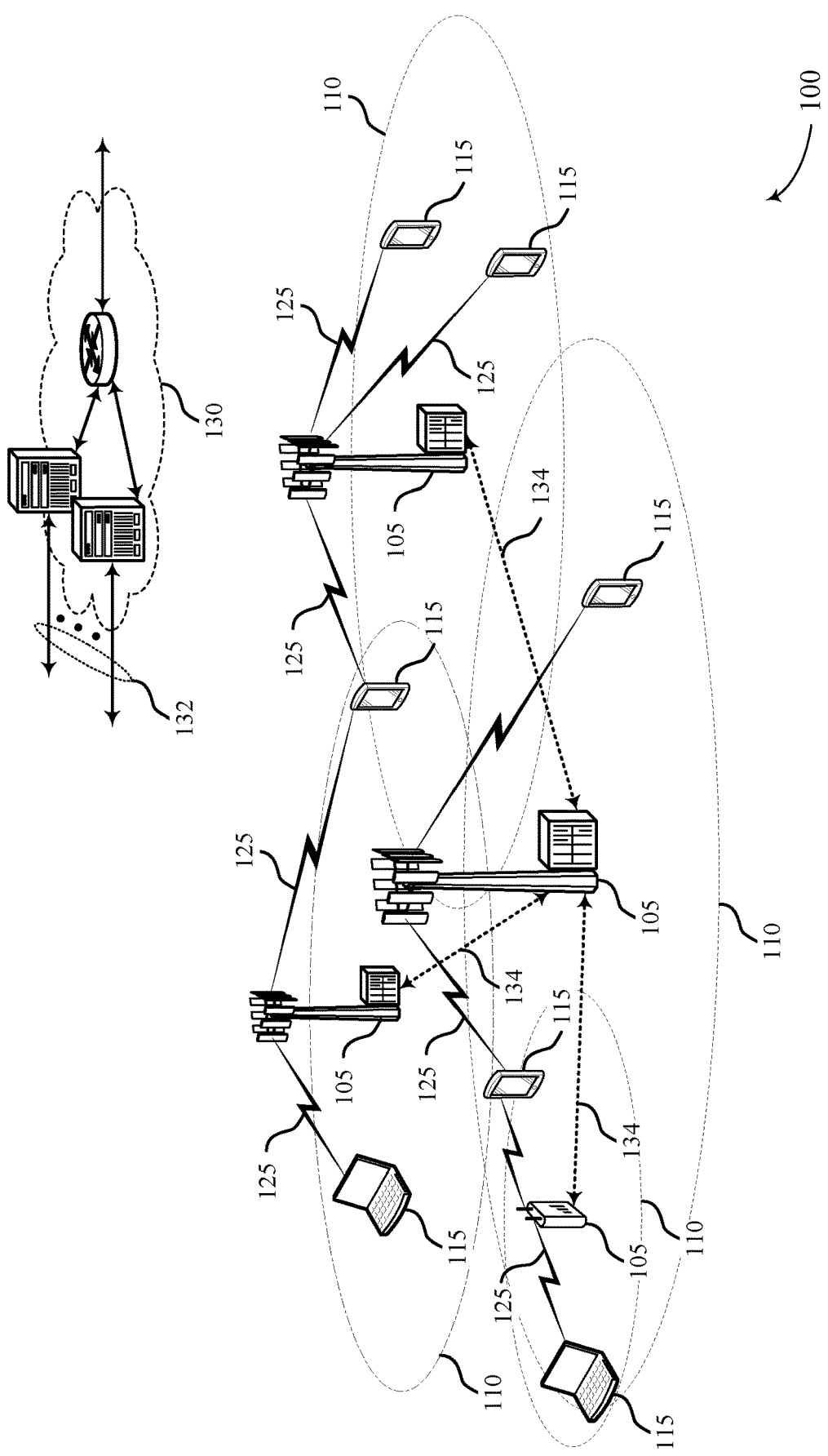
FIG. 1 illustrates an example of a system for wireless communication that supports time synchronization for wireless communications in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. In some cases, base stations 105 and UEs 115 may be referred to nodes.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHmultiplez industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, a plurality of nodes of a network (e.g., base stations 105 and UEs 115) may communicate using a set of messages. For example, a first endpoint node may transmit a message to a second endpoint node via one or more other nodes. A wireline network may implement a time synchronization technique or precision time protocol (PTP), such as Institute of Electrical and Electronics Engineers (IEEE) 802.1AS, "Timing and Synchronization for Time-Sensitive Applications in Bridged Local Area Networks." IEEE 802.1AS defines a distributed PTP for a set of wireline links of a network. For example, in a factory setting, nodes associated with automated machinery may implement time synchronization techniques to ensure synchronized operation of the automated machinery to within a threshold level of synchronization (e.g., clock synchronization to within 1 second, to within 0.1 seconds, to within 0.01 seconds, to within 0.001 seconds, to within 0.0001 seconds, and/or the like).

In some time synchronization techniques, such as PTP, a node (e.g., associated with a base station and/or switch) may include a grand master (GM) function, which may include a time source providing a reference time. The node may transmit PTP messages to peer nodes (e.g., other base stations) that are connected via wireline connections to the node. The peer devices may process the PTP messages, and may propagate the PTP messages to subsequent end devices in the network. A PTP message may include a timestamp indicator identifying the reference time, such as a timestamp of the GM function, and may include an aggregated delay indicator identifying an aggregated delay relating to propagation of the PTP message from a first node, to a second node, to a third node, and/or the like.

The aggregated delay may include a propagation delay for propagating the PTP message across a wireline link, a residence delay for internal processing by a node, and/or the like. For example, for propagation of a PTP message from a first node, to a second node, and to a third node, the aggregated delay may include a period of time for propagation on a first link between the first node and the second node, a period of time for processing by the second node, and a period of time for propagation on a second link between the second node and the third node, and/or the like. Each node may update the aggregated delay before propagating the PTP message to a next end device in the network. A first node may determine the propagation delay associated with communicating with a second node using a round-trip-time (RTT) measurement. The RTT measurement may include a handshake message exchange to provide time-of-arrival information, time-of-departure, information, and/or the like.

When a node receives a PTP message from an end device, the node may derive a present time of the GM function based at least in part on the reference time at which the PTP message was first transmitted and the aggregated delay associated with propagation of the PTP message. In this way, the node may maintain time synchronization of a time source of the node with other time sources of other nodes. However, some networks may include wireless links, such as cellular links, wireless local area network (WLAN) links, wireless wide area network (WWAN) links, and/or the like. In this case, a propagation delay calculation may be inaccurate when the wireless link is non-symmetric and/or non-deterministic with regard to propagation time. Moreover, PTP techniques may utilize delay measurements associated with the Ethernet layer that may be unavailable for wireless links. As a result, PTP measurements may fail to achieve a threshold level of time synchronization for nodes of a network that includes wireless links.

Some aspects, described herein, may provide time synchronization for wireless communication. For example, a first node (e.g., a base station 105) may determine a mapping between a first time source of the first node and a frame structure of a time synchronized wireless network, and may provide information identifying the mapping to a second node (e.g., a UE 115) of the time synchronized wireless network. In this case, the second wireless node may derive a reference time for time synchronization with the first node based at least in part on the mapping. In this way, the first node and the second node may maintain synchronized time sources using a wireless link. Moreover, based at least in part on at least one of the first node or the second node being connected to a wireline portion of a network, some aspects described herein may enable time synchronization for a heterogeneous network that includes both wireline networks using a time synchronization technique and wireless networks connected thereto.

In some aspects, the second node may configure a timer function (e.g., based on the time synchronization received via a wireless interface from the first node) of a local wired interface on the timing synchronization signal. The second node may transmit a timing control signal to a device connected to the second via the local wired interface (e.g., an end device such as an industrial sensor or machine), where the timing control signal is based on the timer function.

Figure 2:
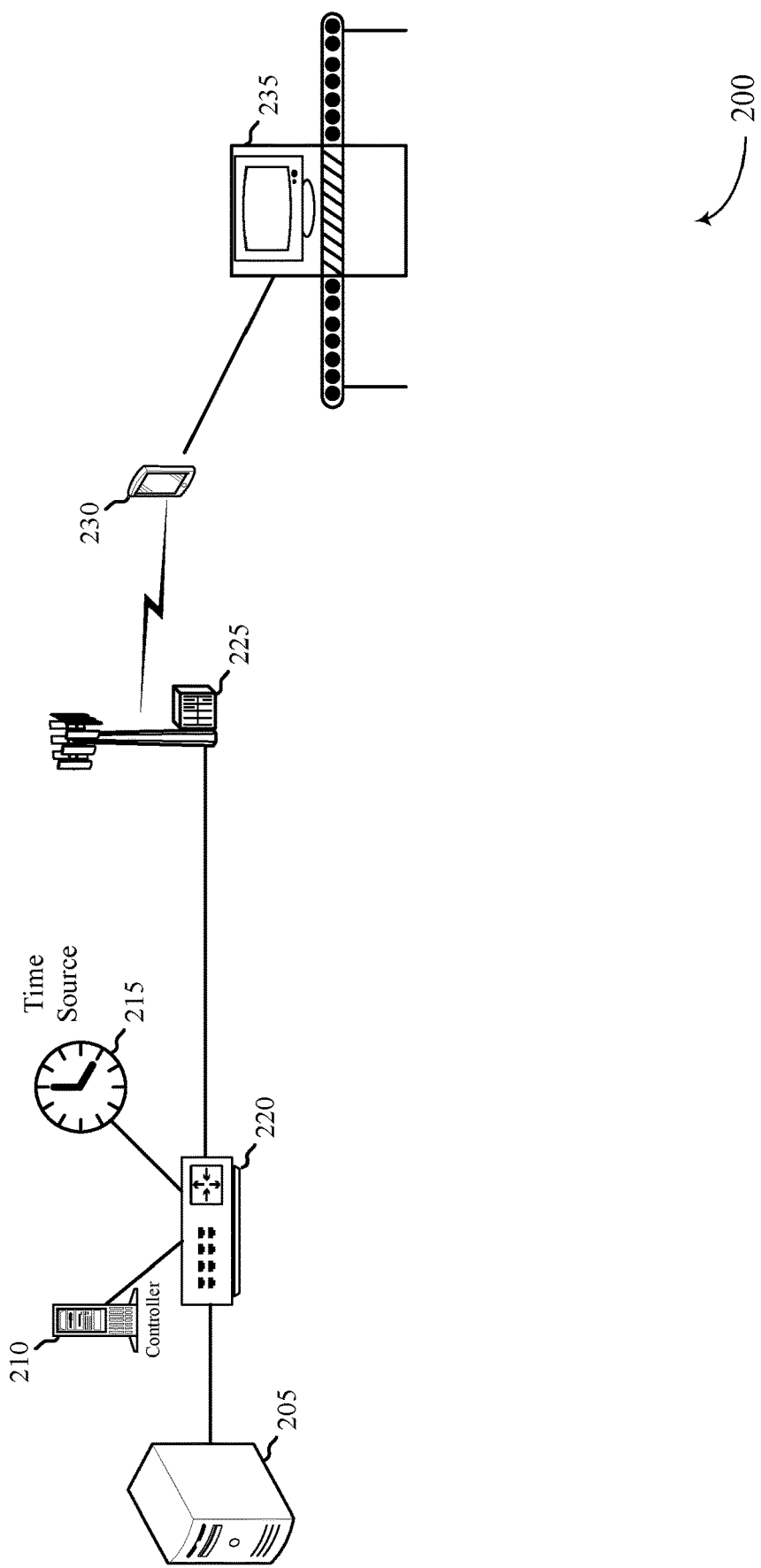
FIG. 2 illustrates an example of a wireless communication system that supports time synchronization for wireless communications in accordance with aspects of the present disclosure.

FIG. 2 illustrates an example of a wireless communication system 200 that supports time synchronization for wireless communications in accordance with various aspects of the present disclosure. In some examples, wireless communication system 200 may implement aspects of wireless communications system 100. Generally, wireless communication system 200 provides one example of an end-to-end timing synchronization service over a cellular system.

Generally, wireless communication system 200 illustrates one example of an industrial application where timing synchronization may be employed. In some aspects, component(s) of wireless communication system 200 may be part of a core network in an LTE/LTE-A, mmW, NR, etc. network, such as is described with respect to wireless communications system 100. In some aspects, one or more devices operating in such a network, including industrial-grade devices, may require timing synchronization satisfying a defined accuracy level.

In some aspects, timing synchronization techniques in a local communication network may use PTP techniques (or a similar synchronization protocol such as a generalized PTP or a timing and synchronization protocol) to provide such timing synchronization. PTP techniques may include a delay response mechanism where delay request-response messages are exchanged over the local communications network to identify timing offsets from the master time at each device. The request-response exchange may identify the transit delays (e.g., the time between message transmission and message reception) and, in the instance where there is an intermediary device acting as a transparent clock, the residence time (e.g., the time between when the intermediary device receives a message and when the intermediary device relays the message).

In some aspects, timing synchronization techniques in a cellular network may include various reference signals, synchronization signals, and the like, that provide timing information to devices operating on the wireless network. Typically, the timing signals (timing synchronization signals) are used by the wireless devices to ensure frame/subframe boundary timing that supports uplink/downlink signals being received within the uplink/downlink frame, respectively.

Therefore, timing synchronization in a local communication network with industrial applications may be different than and have a different purpose than timing in a cellular network. Timing in an industrial setting may be designed to ensure that each device performs its function at a precise time, while timing in a cellular network is generally more lenient, providing windows of time during which devices may communicate with each other. In wireless communication system 200, aspects of the described techniques may combine one or more techniques of timing synchronization in a local communication network with those of a cellular wireless network.

Wireless communication system 200 may include a server 205, a controller 210, a time source 215, a switch 220, and a base station 225 that are connected over a local communication network. Generally, the server 205 may provide various network functionalities, such as running one or more conventional server functions. The controller 210 and time source 215 may generally provide timing synchronization signals for the components of the local communication network and to base station 225, e.g., via the switch 220. For example, controller 210 may receive timing signals from time source 215 and configure one or more messages, signals, etc., to carry or otherwise convey an indication of timing information. The timing information may be absolute timing information, e.g., an indication of the actual time, or relative timing information e.g., an indication of a time with respect to a defined event, reference time, start time, etc.

Base station 225 may generally receive timing information from the controller 210/time source 215 and use the timing information when transmitting various timing synchronization signals. For example, the base station 225 may transmit timing synchronization signals that include any combination of reference signal(s), synchronization signal(s), beam management signal(s), and the like, across a wireless channel to UEs within its coverage area, such as UE 230. The timing synchronization signals may carry or otherwise convey an indication of timing information, e.g., absolute or relative timing information.

In some aspects, UE 230 may be operating within a timing accuracy threshold. In the non-limiting example of FIG. 2, this may include the UE 230 providing a timing control signal to device 235, where the device 235 requires strict timing synchronization to perform a given task, e.g., movement of components of device 235 that must be synchronized. In other aspects, the UE 230 may be operating within a timing accuracy threshold based on other scenarios, e.g., in a vehicle-based deployment where coordinate of sensor information, safety messages, and the like, have stringent latency and reliability requirements.

In some aspects, UE 230 may be a dual-interface UE that is configured with a cellular wireless communication interface and a local wired interface. The UE 230 may receive the timing synchronization signals from base station 225 over the cellular interface and communicate with the device 235 over the local wired interface. In some aspects, the local wired interface is a direct connection, e.g., not a local communication network. In other aspects, the local wired interface is configured for communications over a local communication network. The local wired interface may include a timer function (e.g., one or more clocks, timers, etc.) that UE 230 configures with the timing synchronization signals received from base station 225. UE 230 may transmit a timing control signal to device 235 over the local wired interface. For example, UE 230 may generate the timing control signals based on the timer function. Accordingly, UE 230 may manage or control aspects of device 235 operations using the timing control signals, which are based on the timing synchronization signals received from base station 225.

In some aspects, UE 230 transmitting the timing control signals may be based on the channel performance of the wireless link between base station 225 and UE 230. For example, UE 230 may configure the timer function based on the metric(s) associated with the wireless link, e.g., SINR, bandwidth, throughput, channel quality, etc. When the channel metrics satisfy a threshold, e.g., the channel performance is suitable to meet the timing accuracy requirements of device 235, UE may transmit the timing control signals. When the channel metrics do not satisfy the threshold, UE 230 may withhold the timing control signals.

Figure 3:
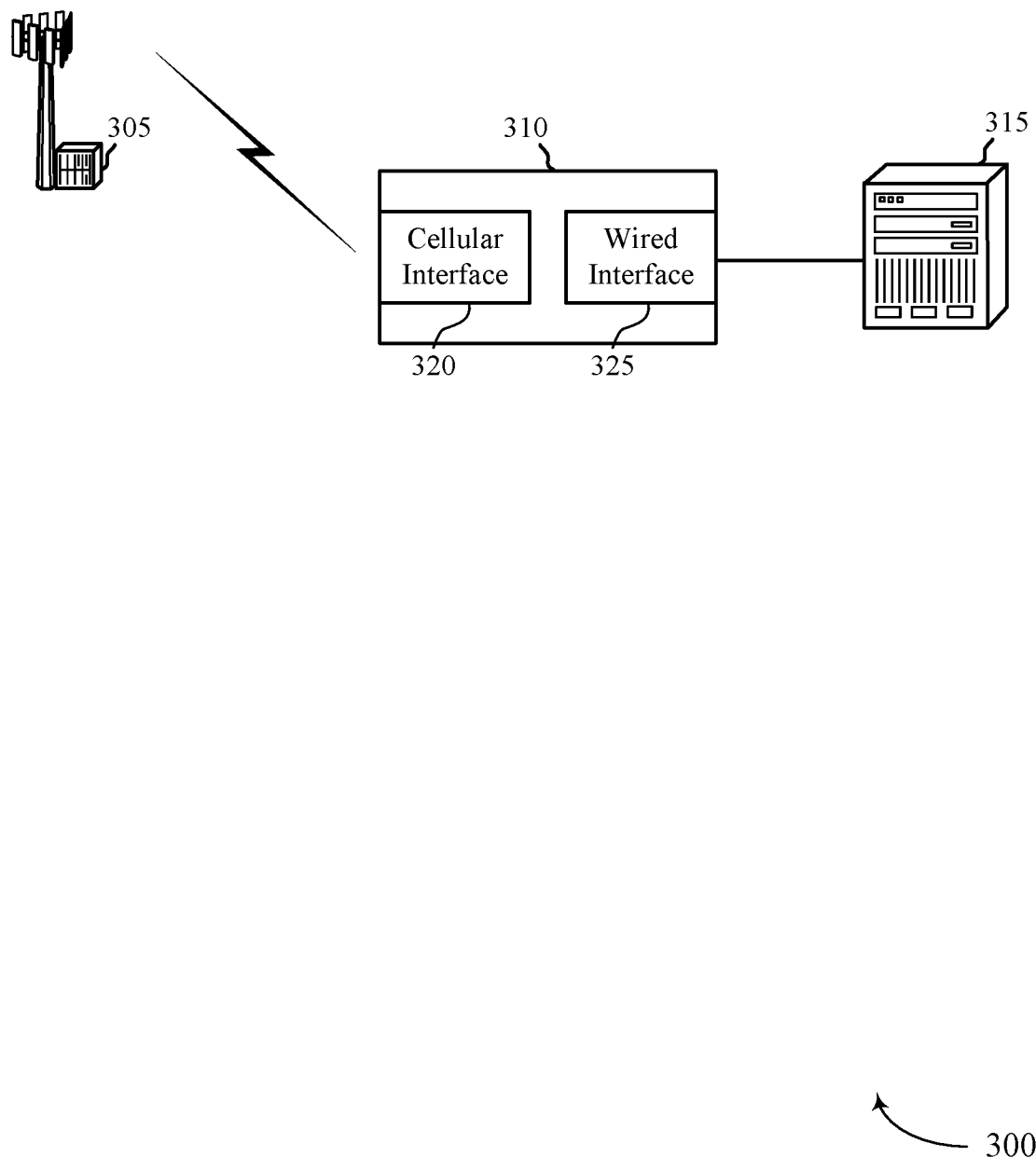
FIG. 3 illustrates an example of a wireless communication system that supports time synchronization for wireless communications in accordance with aspects of the present disclosure.

FIG. 3 illustrates an example of a wireless communication system 300 that supports time synchronization for wireless communications in accordance with various aspects of the present disclosure. In some examples, wireless communication system 300 may implement aspects of wireless communications systems 100/200. Wireless communication system 300 may include a base station 305, a UE 310, and a device 315, which may be examples of the corresponding devices described herein.

Generally, base station 305 may transmit a variety of signals carrying or otherwise conveying timing synchronization signals. The timing synchronization signals may include any combination of reference signal(s), synchronization signal(s), beam management reference signal(s), and the like. The base station 305 may transmit the timing synchronization signals over-the-air to some or all of the UEs operating within its coverage area, such as UE 310.

UE 310 may be configured with two (or more) interfaces, where each interface provides a mechanism for the UE 310 to communicate using a distinct protocol, language, medium, and the like. For example, UE 310 may include a cellular interface 320 and a local wired interface 325. The cellular interface 320 may provide wireless communication functionality for UE 310, which may support wireless communications between base station 305 and UE 310. Thus, UE 310 may receive the timing synchronization signals from base station 305 over the cellular wireless communication link using cellular interface 320.

In some aspects, local wired interface 325 may provide direct communication functionality over a hard-wired connection between device 315. For example, the local wired interface 325 may support UE 310 communicating with device 315 using various protocols, e.g., machine language, IP traffic, or any other language protocol. In some examples, UE 310 is integrated into device 315, or vice versa, such that the local wired interface 325 may be a serial or parallel interface.

In some aspects, local wired interface 325 may include a timer function (e.g., one or more clocks, counters, and the like) that UE 310 configures based on the timing synchronization signal(s) received from base station 305. For example, UE 310 may use the timing information in the timing synchronization signals to set an operational clock, to establish a relative clock, etc. UE 310 may transmit the timing control signals to the device 315 using the local wired interface 325 and based on the timer function.

In some aspects, this may include UE 310 controlling or otherwise managing aspect(s) of device 315. For example, device 315 may be an end device (e.g., may not be connected to any other devices/UEs) that is controlled by UE 310. As one example, the timing control signals may provide operational control for various mechanisms of device 315 that require synchronized timing, movement, etc. In one non-limiting example, the UE 310 may configure a PTP function as the timer function and use PTP commands to transmit the timing control signals to the device 315.

In some aspects, UE 310 that receives timing from the base station 305, e.g., through the cellular interface 320 configured as a 4G/5G modem. This timing information may be used to control timing on another interface, e.g., such as local wired interface 325 or an Ethernet interface. As one non-limiting example, this may include UE 310 configuring a time on Ethernet hardware (such as a clock on the hardware). This configured time may be used by the PTP techniques. Thus, certain aspects include using timing information received on a wireless interface to control the timing on another interface. For example, UE 310 may adjust a clock on the second interface based on the timing information. UE 310 may use the timing information to modify the second interface to control devices connected through the second interface.

Figure 4:
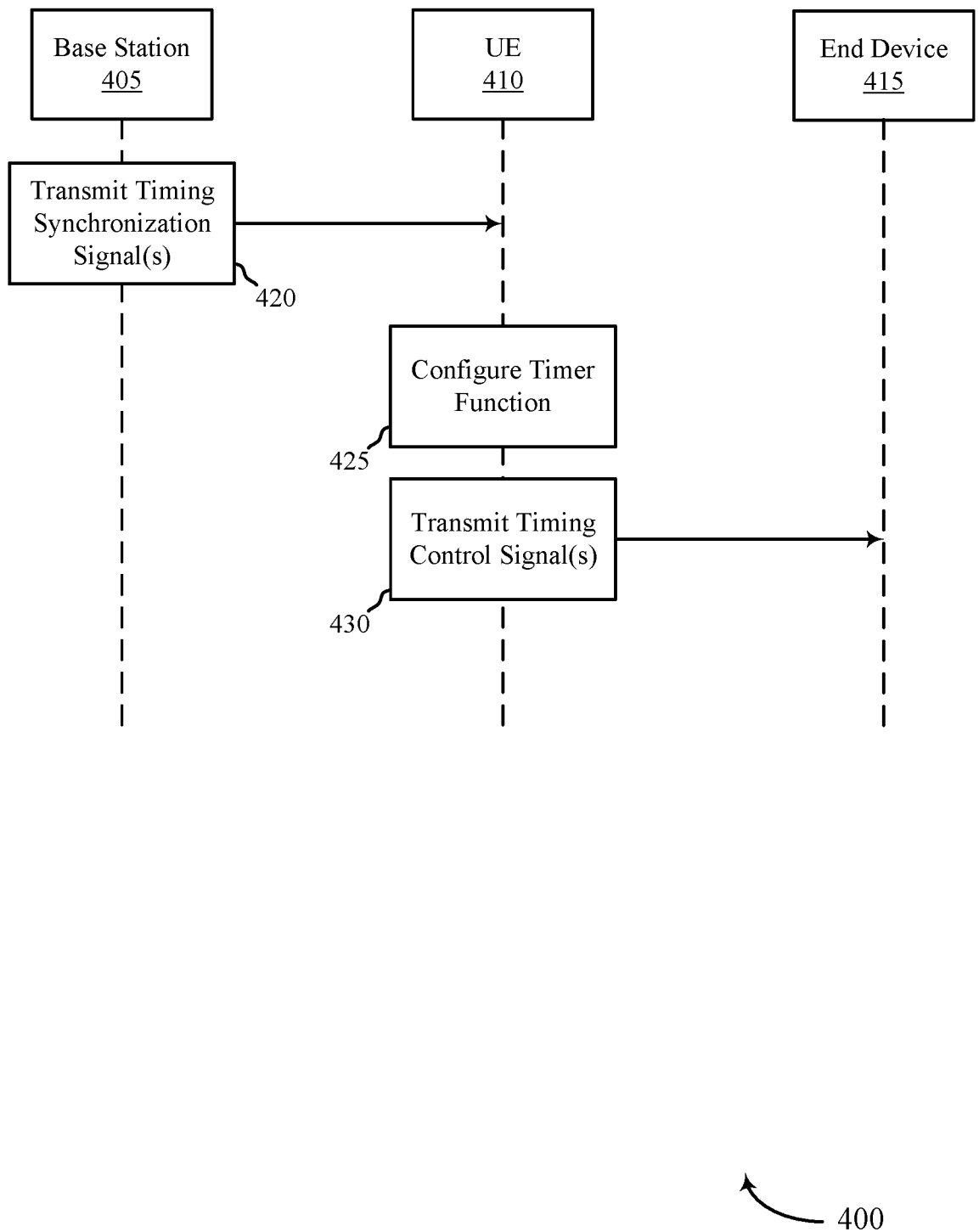
FIGS. 4 and 5 illustrate examples of processes that support time synchronization for wireless communications in accordance with aspects of the present disclosure.

FIG. 4 illustrates an example of a process 400 that supports time synchronization for wireless communications in accordance with various aspects of the present disclosure. In some examples, process 400 may implement aspects of wireless communications systems 100/200/300. Process 400 may include a base station 405, a UE 410, and a device 415, which may be examples of the corresponding devices described herein. In some aspects, device 415 is an end device connected to a local wired interface and controlled by UE 410.

At 420, base station 305 may transmit (and UE 310 may receive) timing synchronization signals over a cellular wireless communication link. The timing synchronization signals may include any combination of a primary synchronization signal, a secondary synchronization signal, system information block (SIB), positioning reference signal (PRS), and the like.

At 425, UE 410 may configure a timer function of a local wired interface of UE 410 based on the timing synchronization signals. In some aspects, this may include UE 410 configuring the timer function as a PTP function.

At 430, UE 410 may transmit (and device 415 may receive) timing control signals via the local wired interface. The timing control signals may be based on the timer function.

In some aspects, UE 410 may configure the timer function and transmit the timing control signals dependent upon the channel performance of the cellular wireless communication link. The metrics of the cellular wireless communication link may include any combination of a reference signal received power (RSRP), a signal-to-noise ratio (SNR), a signal-to-interference-and-noise ratio (SINR), a reference signal received quality (RSRQ), a bandwidth parameter, a throughput parameter, and the like. For example, UE 410 may determine that at least one metric of the cellular wireless communication link satisfies a threshold and transmit the timing control signal to control the device 415 based at least in part on the determination. For example, if UE 410 determines that an RSRP, an RSRQ, an SNR, or an SINR is above a corresponding threshold, the UE 410 may then determine that a timing of the device 415 may be based on the timing information received via the cellular wireless communication link. In another example, if UE 410 determines that the bandwidth or throughput of the cellular wireless communication link is sufficiently high, the UE 410 may then determine that a timing of the device 415 may be based on the timing information received via the cellular wireless communication link. If UE 410 determines that the metric does not satisfy the threshold, UE 410 may withhold the timing control signals.

Figure 5:
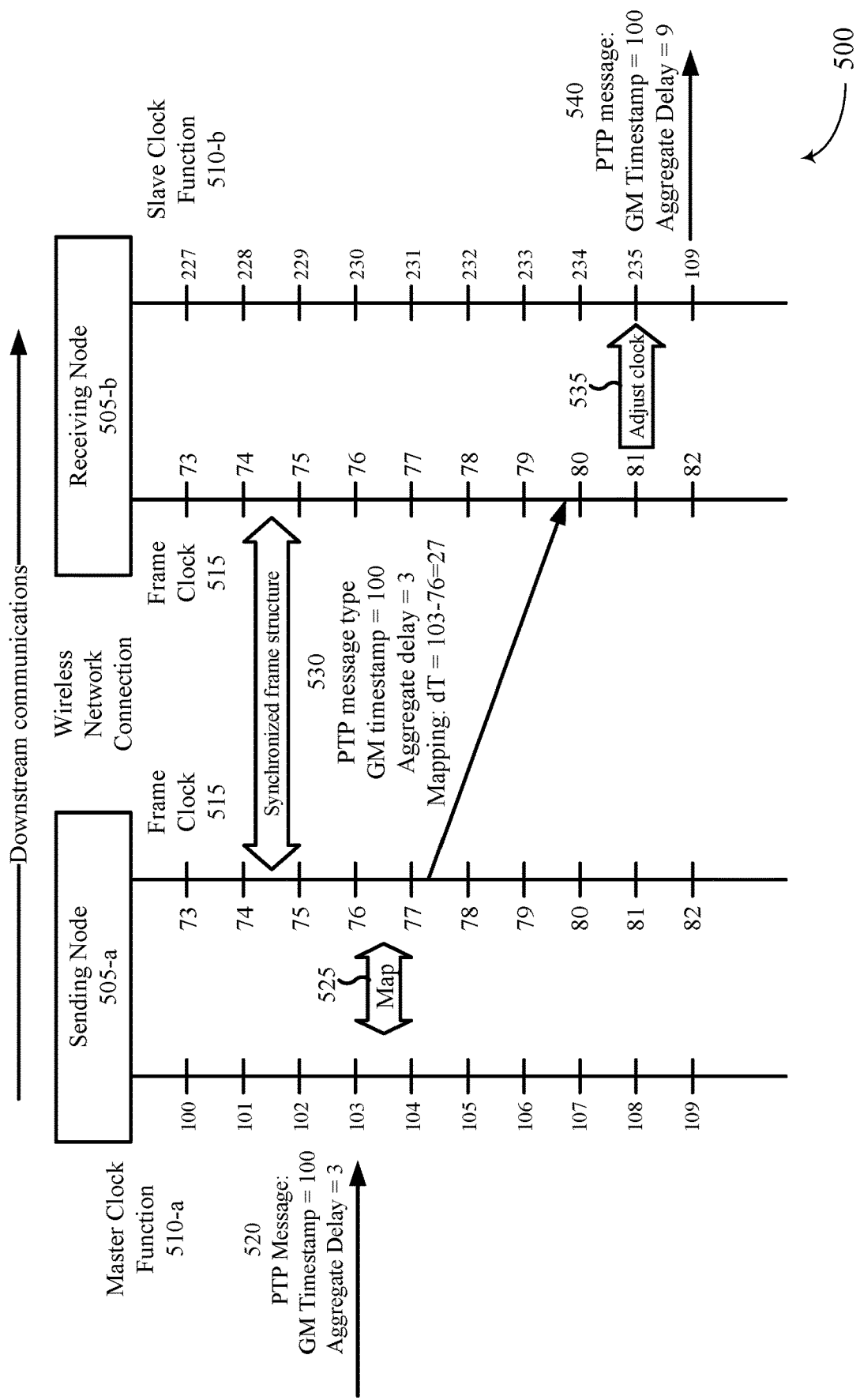
Figure 6:
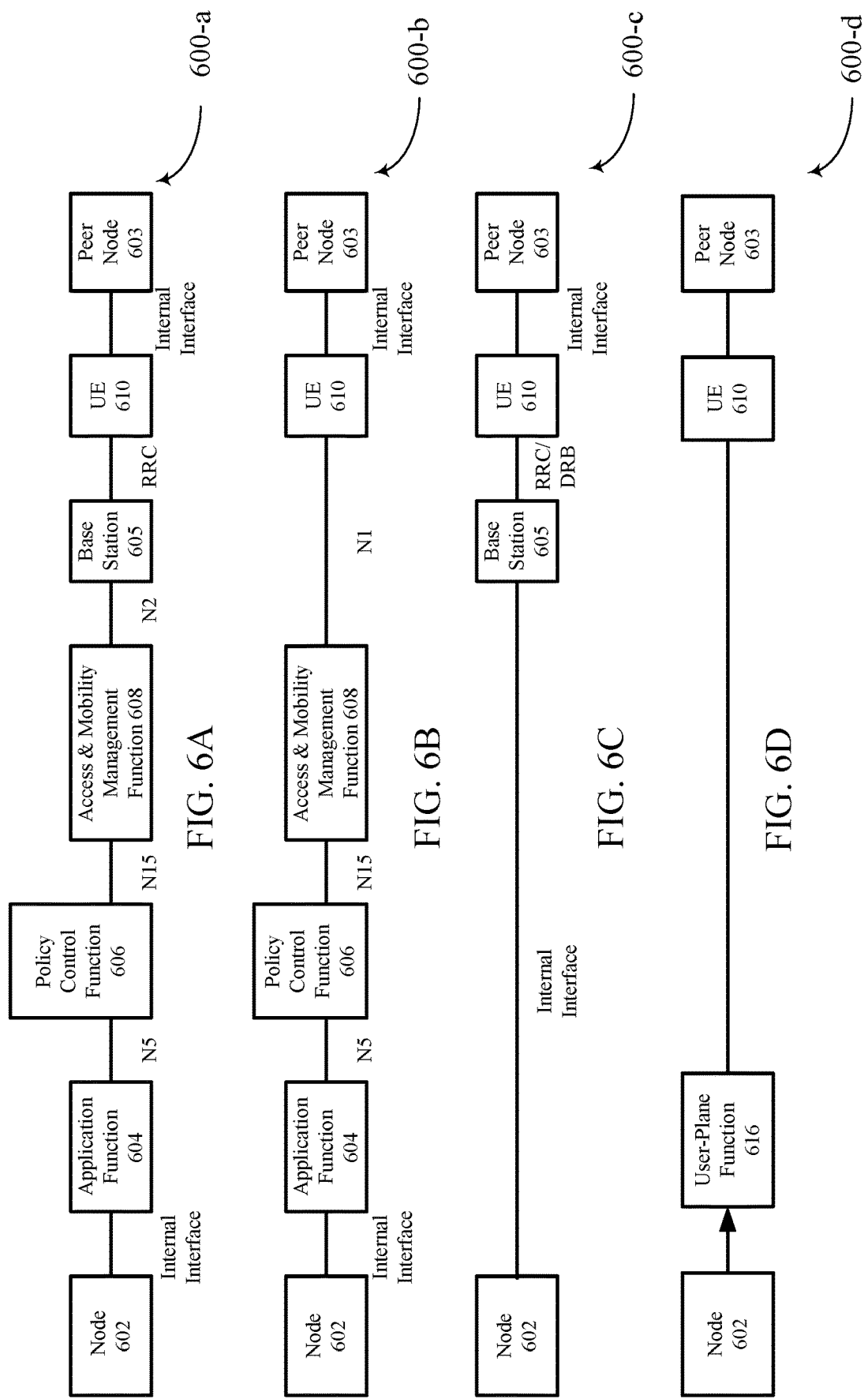

FIG. 5 illustrates an example of a process 500 that supports time synchronization for wireless communications in accordance with aspects of the present disclosure. In some examples, process 500 may implement aspects of wireless communications systems 100, 200, and 300 as well as aspects of process 400. Process 500 may include a sending node 505-*a* and a receiving node 505-*b*, which may be examples of a base station and/or a UE as described herein.

Sending node 505-*a* (e.g., a base station) may enable downstream time synchronization for receiving node 505-*b* (e.g., a UE). Sending node 505-*a* may be associated with a master clock function 510-*a* and a frame clock 515. Similarly, receiving node 505-*b* may be associated with a slave clock function 510-*b* and the frame clock 515. In this case, frame clock 515 is associated with a time synchronized frame structure for a cellular link (e.g., a 5G link) between sending node 505-*a* and receiving node 505-*b*. As shown by reference number 520, sending node 505-*a* may receive a PTP message (e.g., from an upstream node of sending node 505, such as from a switch 220 with a time source 215 as described with reference to FIG. 2 by a wireline connection, a wireless connection, and/or the like). For example, sending node 505-*a* may receive a PTP message including information identifying a reference timestamp for an upstream GM function, an aggregated delay associated with propagation of the PTP message to sending node 505-*a*, and/or the like. In this case, sending node 505-*a* may synchronize master clock function 510-*a* to a reference time of the upstream GM function based at least in part on the PTP message. Additionally, or alternatively, sending node 505-*a* may implement the GM function as master clock function 510-*a*.

As further shown in FIG. 5, and by reference number 525, sending node 505-*a* may determine a mapping between master clock function 510-*a* and frame clock 515. For example, sending node 505-*a* may determine that a first time value, 103, of master clock function 510-*a* of sending node 505-*a* maps to a second time value 76, of frame clock 515. In some aspects, sending node 505-*a* may map a time value of master clock function 510-*a* to an attribute of frame clock 515, such as a frame boundary associated with a particular system frame number, a particular hyper frame number, and/or the like. As shown by reference number 530, sending node 505-*a* may transmit one or more messages to receiving node 505-*b* to time synchronize slave clock function 510-*b* of receiving node 505-*b* to master clock function 510-*a*, and to the upstream GM function. In some aspects, frame clock 515 may maintain time synchronization using a primary synchronization signal, a secondary synchronization signal, a PRS, a sounding reference signal (SRS), a timing advance signal, an observed time difference of arrival (OTDOA) delay determination technique, an uplink-time difference of arrival (UTDOA) delay determination technique, and/or the like.

In some aspects, sending node 505-*a* may transmit, and receiving node 505-*b* may receive, mapping information. For example, the one or more messages may include information identifying the mapping, Mapping: dT=103−76=27 and/or the like. Additionally, or alternatively, sending node 505-*a* may transmit mapping information including a time identifier (e.g., for a time of master clock function 510-*a*) and a frame structure identifier of a frame number, a hyper frame number (HFN), an SFN, a subframe number, and/or the like. In this case, receiving node 505-*b* may derive the mapping between master clock function 510-*a* and frame clock 515 using the time identifier and the frame structure identifier.

In some aspects, sending node 505-*a* may transmit, and receiving node 505-*b* may receive, synchronization information. For example, the one or more messages may include information indicating a type of time synchronization protocol used (e.g., by sending node 505-*a*), such as information indicating that sending node 505-*a* and one or more other upstream nodes associated with the upstream GM function are using a PTP (e.g., IEEE1588), a generalized PTP (gPTP), a timing and synchronization protocol (e.g., IEEE 802.1AS), and/or the like. Additionally, or alternatively, the one or more messages may include a timestamp identifier identifying the reference timestamp for the upstream GM function, GM timestamp=100; a delay identifier identifying the aggregated delay, Aggregate delay=3; and/or the like.

In some aspects, sending node 505-*a* may transmit, and receiving node 505-*b* may receive, the one or more messages on a downlink of the wireless network. For example, when sending node 505-*a* is a base station (e.g., base station 105) and receiving node 505-*b* is a UE (e.g., UE 115), sending node 505-*a* may transmit on the downlink of a cellular link in a time synchronized wireless network. Alternatively, when sending node 505-*a* is a UE (e.g., UE 115) and receiving node 505-*b* is a base station (e.g., base station 105), sending node 505-*a* may transmit on an uplink of the cellular link. In some aspects, sending node 505-*a* may transmit, and receiving node 505-*b* may receive, the one or more messages on a control channel, such as using a control plane of a cellular interface, a user plane of a cellular interface, and/or the like.

In some aspects, sending node 505-*a* may transmit, and receiving node 505-*b* may receive, identification information in the one or more messages. For example, sending node 505-*a* may provide a cellular link identifier, a node identifier, a cell identifier, a radio bearer identifier, a protocol data unit (PDU) session identifier, a PDU connection identifier, and/or the like. In some aspects, sending node 505-*a* may transmit a single message. For example, sending node 505-*a* may transmit mapping information, synchronization information, identification information, and/or the like in a single message. In some aspects, sending node 505-*a* may transmit a plurality of messages. For example, sending node 505-*a* may transmit mapping information using a first message, synchronization information using a second message, identification information using a third message, and/or the like. Additionally, or alternatively, sending node 505-*a* may transmit a plurality of redundant messages to reduce a likelihood of receiving node 505-*b* failing to synchronize slave clock function 510-*b*.

As further shown in FIG. 5, and by reference number 535, receiving node 505-*b* may, based at least in part on receiving the one or more messages from sending node 505-*a*, adjust slave clock function 510-*b*. For example, receiving node 505-*b* may derive a time of master clock function 510-*a*, a reference time of the upstream GM function, and/or the like, and may synchronize slave clock function 510-*b* to master clock function 510-*a*, the reference time of the upstream GM function, and/or the like. As further shown by reference number 540, based at least in part on synchronizing slave clock function 510-*b*, receiving node 505-*b* may transmit a PTP message to another downstream node to synchronize another clock of the other downstream node to slave clock function 510-*b*. For example, slave clock function 510-*b* may be a master clock relative to a slave clock of a downstream node, and receiving node 505-*b* may provide information to the downstream node (e.g., a PTP message for a wireline connection to the downstream node, mapping information and synchronization information for a wireless connection to the downstream node, and/or the like).

In some aspects, sending node 505-*a* and receiving node 505-*b* may support redundant time synchronization. For example, a network including sending node 505-*a* and receiving node 505-*b* may be associated with a plurality of GM functions providing a plurality of sets of PTP messages. In this case, each PTP message may include identification information identifying a corresponding GM function, to enable a plurality of time synchronization instances, and receiving node 505-*b* may set one of a plurality of slave clock functions 510-*b* based at least in part on received synchronization information associated with a corresponding one of a plurality of master clock functions 510-*a* and a corresponding one of a plurality of GM functions.

Although some aspects, described herein, are described in terms of downstream propagation of time synchronization, such as from a base station (e.g., base station 105) to a UE (e.g., UE 115), some aspects, described herein, may use upstream propagation of time information, such as from the UE to the base station; non-hierarchical propagation of time information, such as between multiple UEs (e.g., connected using a wireless sidelink), multiple base stations (e.g., connected using a wireless backhaul), and/or a combination of multiple UEs and multiple base stations; and/or the like.

FIG. 6A through 6D show block diagrams of systems that support time synchronization for wireless communications in accordance with aspects of the present disclosure. In some examples, block diagrams 600 may implement aspects of wireless communications systems 100, 200, and 300 as well as processes 400 and 500. In some cases, the node 602 may be include aspects of switch 220 as described with reference to FIG. 2 and aspects of nodes 505 as described with reference to FIG. 5. In some cases, base stations 605 may include aspects of base stations 105, 225, 305, 405, and sending nodes 505 as described with reference to FIGS. 1 through 5. UEs 610 may include aspects of UEs 115, 230, 310, 410, and sending nodes 505 as described with reference to FIGS. 1 through 5. Peer nodes 603 may be examples of nodes 505 as described with reference to FIG. 5. In some cases, UE 610 may be collocated with an peer node 603.

As shown in block diagram 600-*a* of FIG. 6A, a node 602 may propagate PTP information via an internal interface to application function 604. Application function 604 may process the PTP information and may generate a cellular signaling message (e.g., including mapping information, synchronization information, and/or the like). Application function 604 may provide the cellular signaling message via a cellular N5 interface to policy control function 606. Policy control function 606 may provide the cellular signaling message via the cellular N15 interface to access and mobility management function 608, which may provide the cellular signaling message via the cellular N2 interface to base station 605. base station 605 may provide the cellular signaling message via an RRC connection to UE 610, which may process the cellular signaling message to determine the mapping information, the synchronization information, and/or the like. UE 610 may provide the mapping information, the synchronization information, and/or the like to peer node 603. Peer node 603 may use the mapping information, the synchronization information, and/or the like to synchronize a clock of peer node 603 to a clock of node 602. In this way, base station 605 and UE 610 enable synchronization of a set of nodes via a wireless connection.

As shown in block diagram 600-b of FIG. 6B, in contrast, access and mobility management function 608 provides a cellular signaling message (e.g., including mapping information, synchronization information, and/or the like) via a non-access-stratum (NAS) message to UE 610. For example, rather than the policy control function 606 providing the cellular signaling message to access and mobility management function 608, and access and mobility management function 608 providing the cellular signaling message to base station 605 to transmit to UE 610, the NAS message is provided directly via the N1 interface from access and mobility management function 608 to UE 610. In this way, access and mobility management function 608 enables time synchronization for nodes of a time synchronized wireless network.

In some aspects, node 602 may determine a UE 610 of a plurality of available UEs to which to provide the cellular signaling message. For example, node 602 may include a UE identifier (e.g., an international mobile subscriber identity (IMSI), a network address, and/or the like) as identification information with the cellular signaling message. In this case, policy control function 606, access and mobility management function 608, a base station 605, and/or the like may resolve the UE identifier to a temporary mobile subscriber identity (TMSI), a cell radio network temporary identifier (C-RNTI), and/or the like to direct the cellular signaling message to one or more UEs (e.g., UE 610). In some aspects, the cellular signaling message may be conveyed between access and mobility management function 608 and UE 610 using a transparent container of the cellular control plane.

As shown in block diagram 600-c of FIG. 6C, in contrast, when node 602 and application function 604 are not collocated, node 602 may time synchronize with application function 604 using a backhaul link, node 602 may time synchronize with base station 605 via an internal interface, and base station 605 may synchronize with UE 610 using RRC.

In some cases, the base station 605 may provide the cellular signaling message using the user plane and via a dedicated data radio bearer (DRB). In some aspects, the cellular signaling message may be provided via another transport technique, such as via another network topology, another connection, another interface, and/or the like.

As shown in block diagram 600-d of FIG. 6D, in contrast, the cellular signaling message may be provided using the user plane of the cellular interface. For example, when base station 605 and a user-plane function 616 are collocated, a PDU session or a flow identifier may be provided to enable node 602 to provide the cellular signaling message to user-plane function 616, for user-plane function 616 to provide the cellular signaling message to UE 610. In some aspects, the cellular signaling message may be provided using a particular type of PDU session, such as using an Ethernet connection, an Internet Protocol version 4 (IPv4) connection, an Internet Protocol version 6 (IPv6) connection, an unstructured connection, and/or the like.

Figure 7:
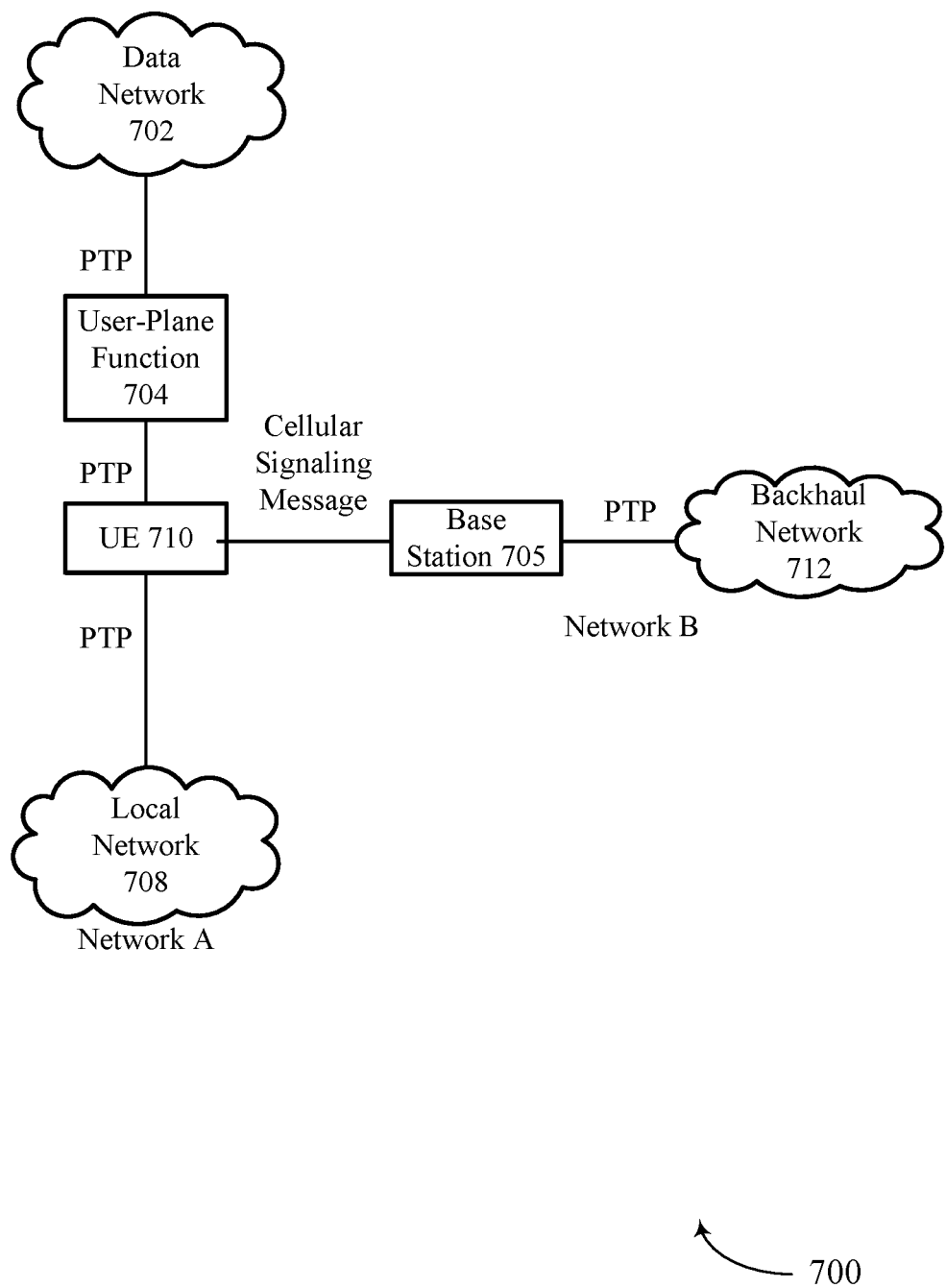

FIG. 7 shows a block diagram of a system 700 that supports time synchronization for wireless communications in accordance with aspects of the present disclosure. Base station 705 may include aspects of base stations 105, 225, 305, 405, and 605 and sending nodes 505 as described with reference to FIGS. 1 through 6. UE 710 may include aspects of UEs 115, 230, 310, 410, and 610 and sending nodes 505 as described with reference to FIGS. 1 through 6. User-plane function 704 may be an example of user-plane function 616 as described with reference to FIG. 6.

As shown in FIG. 7, system 700 may include a network A, which includes a data network 702, a user-plane function 704, a UE 710, and a local network 708; and a network B, which includes a base station 705 and a backhaul network 712. In this case, a GM function may be collocated in backhaul network 712, and a node of backhaul network 712 may provide a PTP message to base station 705. Base station 705 may provide a cellular signaling message to UE 710 to convey synchronization information, mapping information, identification information, and/or the like. UE 710 may synchronize a clock of UE 710 with a clock of the GM function and/or a clock of base station 705 based at least in part on the cellular signaling information. UE 710 may provide PTP messages to user-plane function 704, which may propagate a PTP message to data network 702, and to local network 708. In this way, UE 710 and base station 705 enable inter-network time synchronization using a wireless connection (e.g., between UE 710 and base station 705). In some aspects, network A and network B may be associated with the same protocol types (e.g., both network A and network B using Ethernet), different protocol types (e.g., network A using Ethernet and network B using IPv4), and/or the like.

Figure 8:
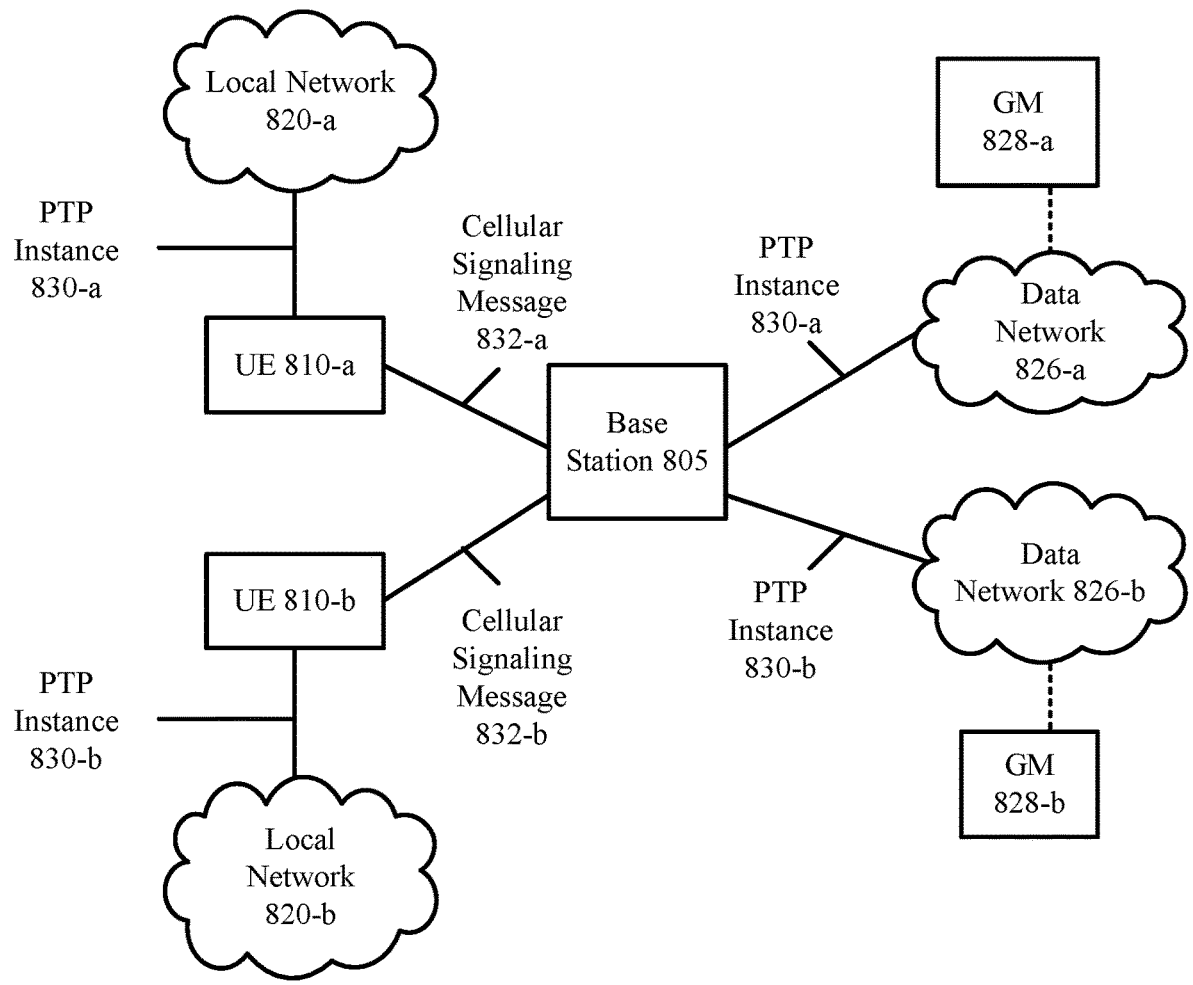

FIG. 8 shows a block diagram of a system 800 that supports time synchronization for wireless communications in accordance with aspects of the present disclosure. Base station 805 may include aspects of base stations 105, 225, 305, 405, 605, and 705 and sending nodes 505 as described with reference to FIGS. 1 through 7. UE 810 may include aspects of UEs 115, 230, 310, 410, 610, and 710 and sending nodes 505 as described with reference to FIGS. 1 through 7. User-plane function 804 may be an example of user-plane functions 616 and 704 as described with reference to FIGS. 6 and 7.

As shown in FIG. 8, system 800 may include a local network 820-a associated with a UE 810-a; a local network 820-b associated with a UE 810-b; a base station 805, which may include a user-plane function and an application function; a data network 826-a, which may be associated with a GM function 828-a; and a data network 826-b, which may be associated with a GM function 828-b. In this case, local network 820-a, UE 810-a, data network 826-a, and GM function 828-a are associated with a first time synchronization instance, PTP instance 830-a; and local network 820-b, UE 810-b, data network 826-b, and GM function 828-b are associated with a second time synchronization instance, PTP instance 830-b. base station 805 may be common to PTP instance 830-a and PTP instance 830-b. In this case, base station 805 may transmit a first cellular signaling message 832-a to UE 810-a to provide mapping information and synchronization information pertaining to PTP instance 830-a and to GM function 828-a. Based on receiving first cellular signaling message 832-a, UE 810-a may provide PTP messages to end devices of local network 820-a to synchronize clocks of the end devices to GM 828-a.

Similarly, base station 805 may transmit a second cellular signaling message 832-b to UE 810-b to provide mapping information and synchronization information pertaining to PTP instance 830-b and to GM function 828-b. In this case, based at least in part on receiving second cellular signaling message 832-b, UE 810-b may provide PTP messages to end devices of local network 820-b to synchronize clocks of the end devices to GM 828-b.

In some aspects, a cellular signaling message 832 may include information identifying a corresponding PTP instance 830, a cellular link identifier to indicate a corresponding UE 810 to which the cellular signaling message 832 is to be directed, and/or the like. In some aspects, the cellular signaling message 832 may include a PDU session identifier, a DRB identifier, and/or the like to indicate a corresponding UE 810 to which the cellular signaling message 832 is to be directed. In some aspects, base station 805 may not be associated with a user-plane function, an application function, and/or the like. In some aspects, base station 805 may be associated with a plurality of backhaul interfaces. For example, base station 805 may be associated with a first backhaul interface for data network 826-*a* and a second backhaul interface for data network 826-*b*. In some aspects, base station 805 may extract identification information from a PTP message to enable forwarding for synchronization information to a UE 810. For example, base station 805 may determine that a PTP message includes an Internet Protocol prefix, a virtual local area network identifier, an Ethernet type identifier, and/or the like included in a packet header, and may identify, for example UE 810-*a* as a destination node for the PTP message.

Figure 9:
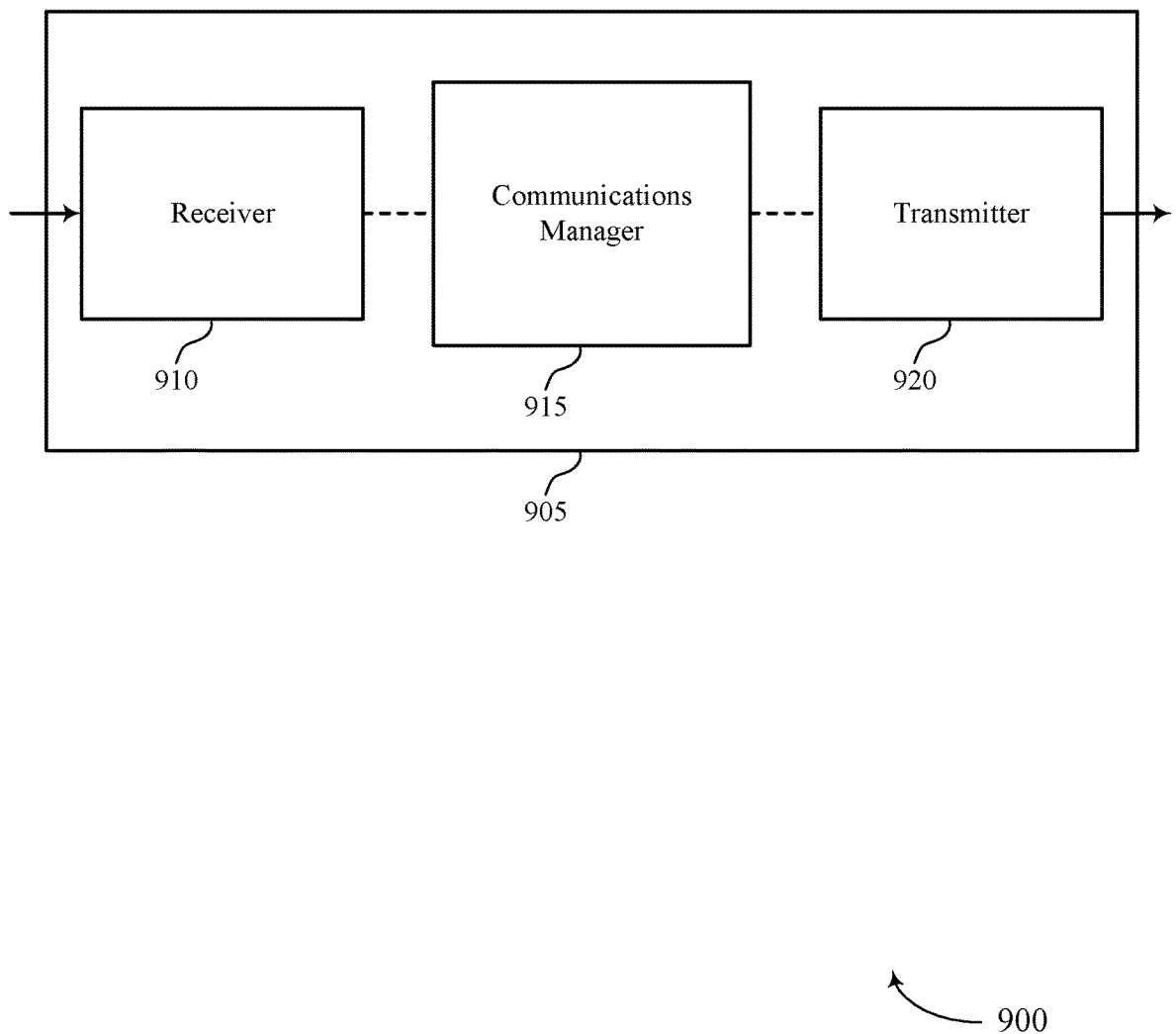
FIGS. 9 through 11 show block diagrams of a device that supports time synchronization for wireless communications in accordance with aspects of the present disclosure.

FIG. 9 shows a block diagram 900 of a wireless device 905 that supports time synchronization for wireless communications in accordance with aspects of the present disclosure. Wireless device 905 may be an example of aspects of a UE 115 as described herein. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to time synchronization of a second interface based on information received over a first interface, etc.). Information may be passed on to other components of the device. The receiver 910 may be an example of aspects of the transceiver 1235 described with reference to FIG. 12. The receiver 910 may utilize a single antenna or a set of antennas.

Communications manager 915 may be an example of aspects of the communications manager 1215 described with reference to FIG. 12.

Communications manager 915 and/or at least some of its various sub-components may be implemented in hardware, software executed by a processor, firmware, or any combination thereof. If implemented in software executed by a processor, the functions of the communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 915 and/or at least some of its various sub-components may be physically located at various positions, including being distributed such that portions of functions are implemented at different physical locations by one or more physical devices. In some examples, communications manager 915 and/or at least some of its various sub-components may be a separate and distinct component in accordance with various aspects of the present disclosure. In other examples, communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 915 may receive, by a UE, a timing synchronization signal from a base station over a cellular wireless communication link, configure a timer function of a local wired interface of the UE based on the timing synchronization signal, and transmit a timing control signal to a device connected to the UE via the local wired interface, where the timing control signal is based on the timer function.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
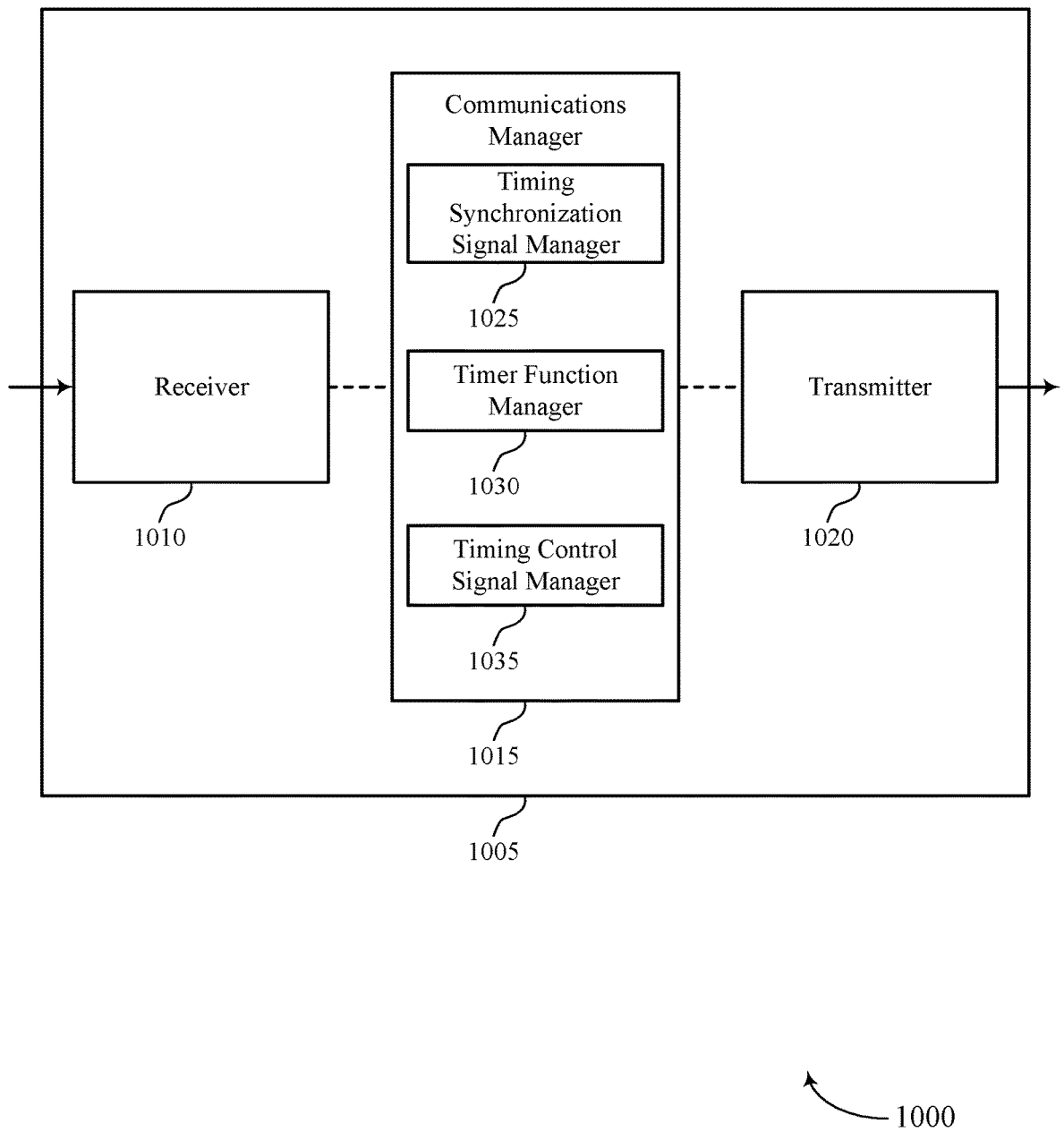

FIG. 10 shows a block diagram 1000 of a wireless device 1005 that supports time synchronization for wireless communications in accordance with aspects of the present disclosure. Wireless device 1005 may be an example of aspects of a wireless device 905 or a UE 115 as described with reference to FIG. 9. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to time synchronization of a second interface based on information received over a first interface, etc.). Information may be passed on to other components of the device. The receiver 1010 may be an example of aspects of the transceiver 1235 described with reference to FIG. 12. The receiver 1010 may utilize a single antenna or a set of antennas.

Communications manager 1015 may be an example of aspects of the communications manager 1215 described with reference to FIG. 12.

Communications manager 1015 may also include timing synchronization signal manager 1025, timer function manager 1030, and timing control signal manager 1035.

Timing synchronization signal manager 1025 may receive, by a UE, a timing synchronization signal from a base station over a cellular wireless communication link.

Timer function manager 1030 may configure a timer function of a local wired interface of the UE based on the timing synchronization signal.

Timing control signal manager 1035 may transmit a timing control signal to a device connected to the UE via the local wired interface, where the timing control signal is based on the timer function. In some cases, the device is an end device connected to the local wired interface and controlled by the UE.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
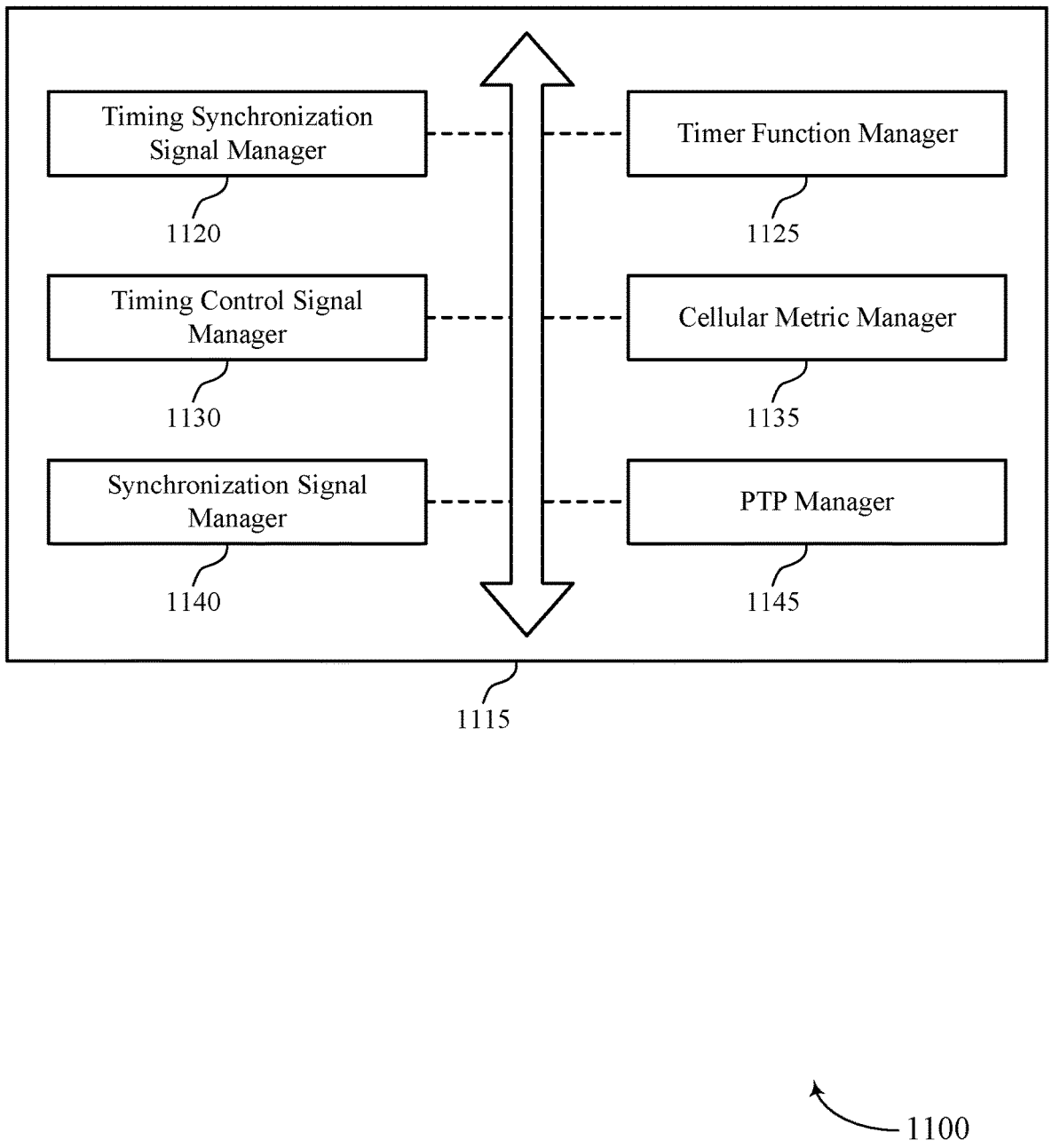

FIG. 11 shows a block diagram 1100 of a communications manager 1115 that supports time synchronization for wireless communications in accordance with aspects of the present disclosure. The communications manager 1115 may be an example of aspects of a communications manager 915, a communications manager 1015, or a communications manager 1215 described with reference to FIGS. 9, 10, and 12. The communications manager 1115 may include timing synchronization signal manager 1120, timer function manager 1125, timing control signal manager 1130, cellular metric manager 1135, synchronization signal manager 1140, and PTP manager 1145. Each of these modules may communicate, directly or indirectly, with one another (e.g., via one or more buses).

Timing synchronization signal manager 1120 may receive, by a UE, a timing synchronization signal from a base station over a cellular wireless communication link.

Timer function manager 1125 may configure a timer function of a local wired interface of the UE based on the timing synchronization signal.

Timing control signal manager 1130 may transmit a timing control signal to a device connected to the UE via the local wired interface, where the timing control signal is based on the timer function. In some cases, the device is an end device connected to the local wired interface and controlled by the UE.

Cellular metric manager 1135 may determine that at least one metric of the cellular wireless communication link satisfies a threshold, transmit the timing control signal to control the device based on the determination, determine that at least one metric of the cellular wireless communication link fails to satisfy a threshold, and withhold the timing control signal from the device based on the determination. In some cases, the at least one metric of the cellular wireless communication link includes at least one of: a RSRP, a SNR, a SINR, a RSRQ, a bandwidth parameter, a throughput parameter, or a combination thereof.

Synchronization signal manager 1140 may receive the timing synchronization signal from the base station using at least one of: a primary synchronization signal, a secondary synchronization signal, a system information block, a positioning reference signal, or any combination thereof.

PTP manager 1145 may configure the timer function as a PTP function, a generalized PTP function, or a timing and synchronization protocol function.

Figure 12:
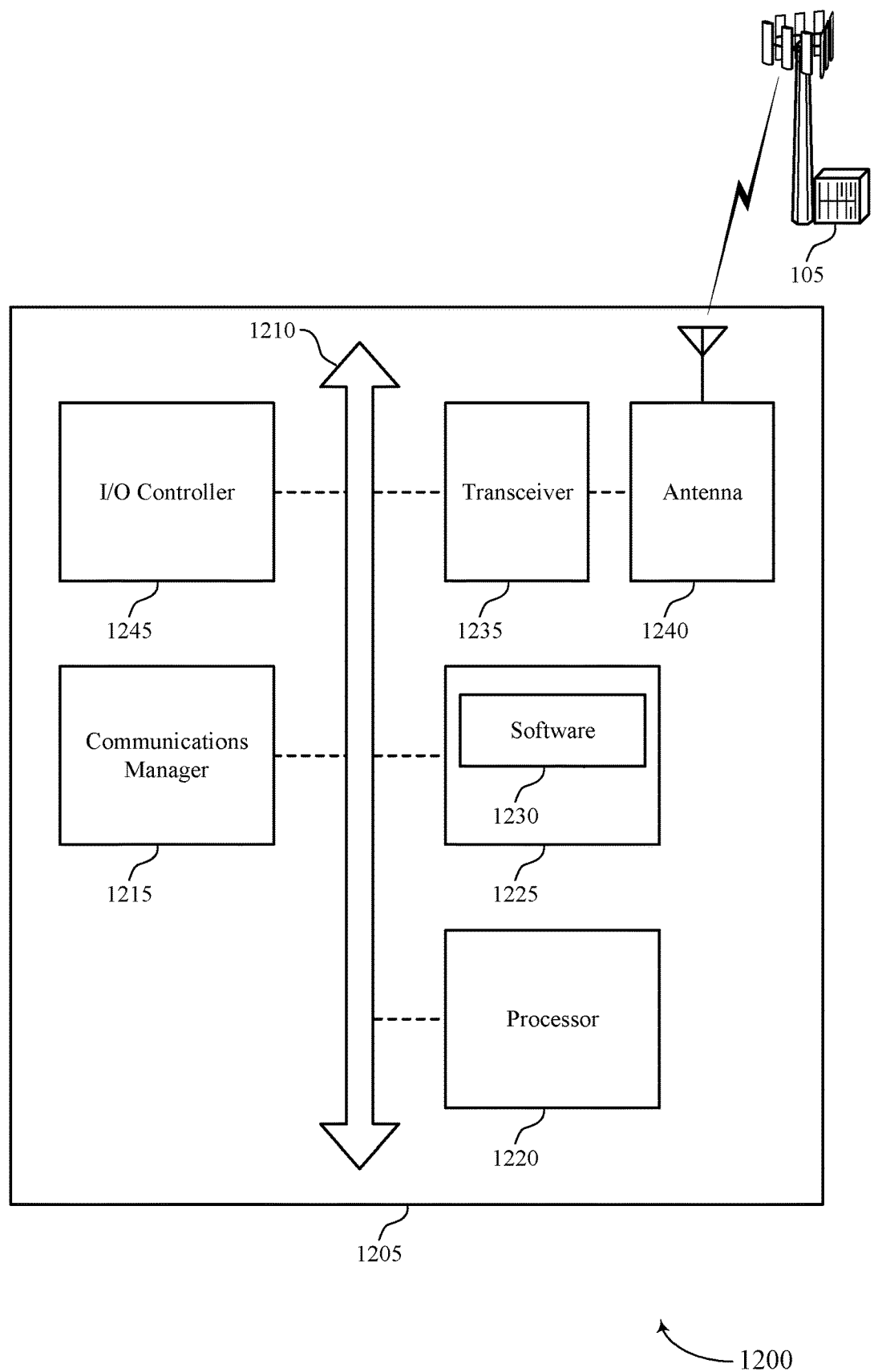
FIG. 12 illustrates a block diagram of a system including a UE that supports time synchronization for wireless communications in accordance with aspects of the present disclosure.

FIG. 12 shows a diagram of a system 1200 including a device 1205 that supports time synchronization for wireless communications in accordance with aspects of the present disclosure. Device 1205 may be an example of or include the components of wireless device 905, wireless device 1005, or a UE 115 as described herein, e.g., with reference to FIGS. 9 and 10. Device 1205 may include components for bi-directional voice and data communications including components for transmitting and receiving communications, including communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting time synchronization of a second interface based on information received over a first interface).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support time synchronization of a second interface based on information received over a first interface. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described herein. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
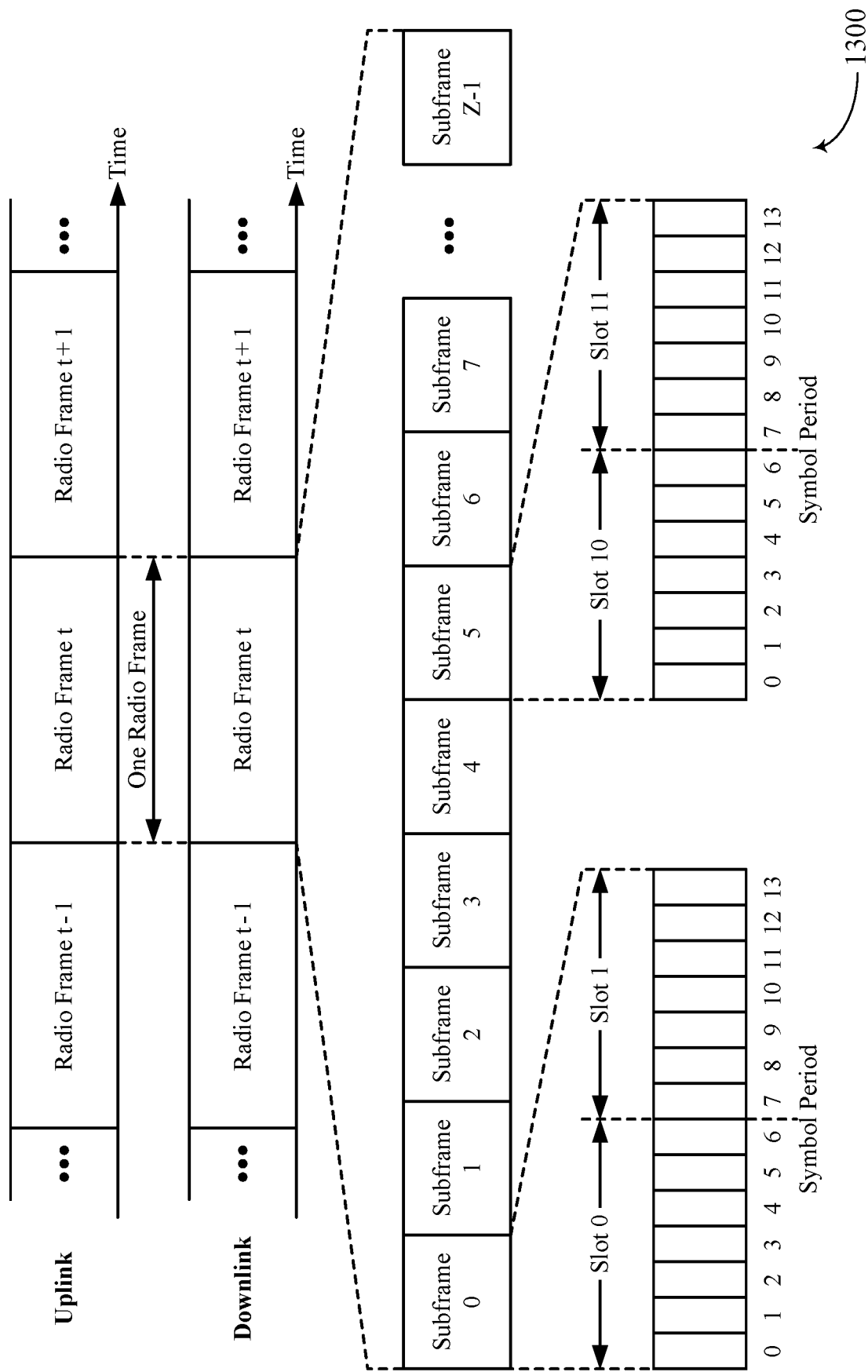
FIG. 13 illustrates an example of a frame structure that supports time synchronization for wireless communications in accordance with aspects of the present disclosure.

FIG. 13 illustrates an example of a frame structure 1300 that supports time synchronization for wireless communications in accordance with aspects of the present disclosure.

FIG. 13 shows an example frame structure 1300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 13). Each slot may include a set of L symbol periods. For example, each slot may include seven symbol periods (e.g., as shown in FIG. 13), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal, secondary synchronization signal, and/or the like, on the downlink for each cell supported by the base station. The primary synchronization signal and secondary synchronization signal may be used by UEs for cell search and acquisition. For example, the primary synchronization signal may be used by UEs to determine symbol timing, and the secondary synchronization signal may be used by UEs to determine a physical cell identifier, associated with the base station, and frame timing. The base station may also transmit a physical broadcast channel (PBCH). The PBCH may carry some system information, such as system information that supports initial access by UEs.

Figure 14:
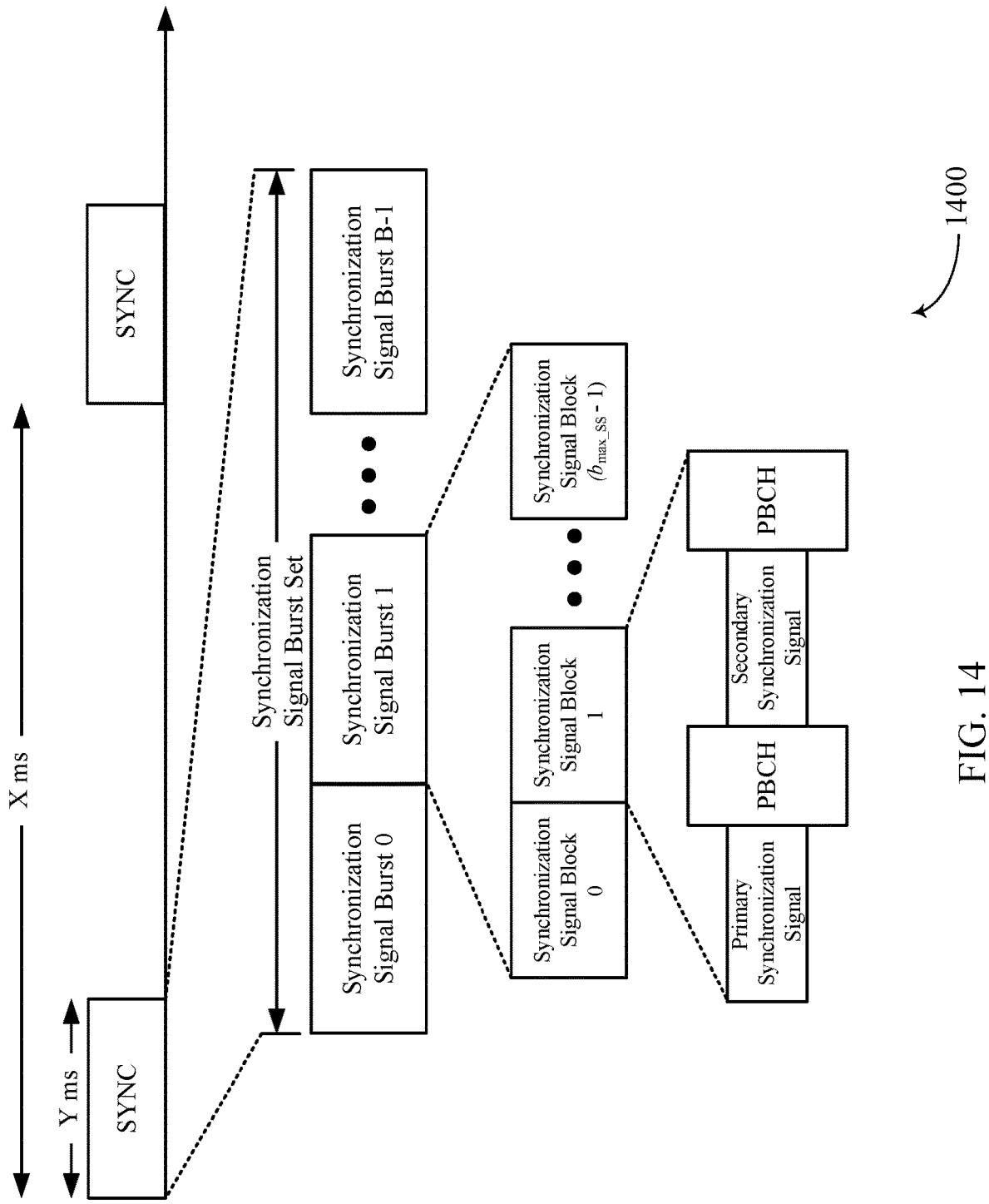
FIG. 14 illustrates an example synchronization communication hierarchy that supports time synchronization for wireless communications in accordance with aspects of the present disclosure.

In some aspects, the base station may transmit the primary synchronization signal, the secondary synchronization signal, and/or the PBCH in accordance with a synchronization communication hierarchy (e.g., a synchronization signal hierarchy) including multiple synchronization communications (e.g., synchronization signal blocks), as described herein in connection with FIG. 14.

As indicated above, FIG. 13 is provided as an example. Other examples are possible and may differ from what was described with regard to FIG. 13.

FIG. 14 illustrates an example of a synchronization communication hierarchy 1400 that supports time synchronization for wireless communications in accordance with aspects of the present disclosure.

FIG. 14 is a block diagram conceptually illustrating an example synchronization signal hierarchy, which is an example of a synchronization communication hierarchy. As shown in FIG. 14, the synchronization signal hierarchy may include an synchronization signal burst set, which may include a plurality of synchronization signal bursts (identified as synchronization signal burst 0 through synchronization signal burst B−1, where B is a maximum number of repetitions of the synchronization signal burst that may be transmitted by the base station). As further shown, each synchronization signal burst may include one or more synchronization signal blocks (identified as synchronization signal block 0 through synchronization signal block (bmax_SS−1), where bmax_SS−1 is a maximum number of synchronization signal blocks that can be carried by an synchronization signal burst). In some aspects, different synchronization signal blocks may be beam-formed differently. An synchronization signal burst set may be periodically transmitted by a wireless node, such as every X milliseconds, as shown in FIG. 3B. In some aspects, an synchronization signal burst set may have a fixed or dynamic length, shown as Y milliseconds in FIG. 14.

The synchronization signal burst set shown in FIG. 14 is an example of a synchronization communication set, and other synchronization communication sets may be used in connection with the techniques described herein. Further, the synchronization signal block shown in FIG. 14 is an example of a synchronization communication, and other synchronization communications may be used in connection with the techniques described herein.

In some aspects, an synchronization signal block includes resources that carry the primary synchronization signal, the secondary synchronization signal, the PBCH, and/or other synchronization signals (e.g., a tertiary synchronization signal (TSS)) and/or synchronization channels. In some aspects, multiple synchronization signal blocks are included in an synchronization signal burst, and the primary synchronization signal, the secondary synchronization signal, and/or the PBCH may be the same across each synchronization signal block of the synchronization signal burst. In some aspects, a single synchronization signal block may be included in an synchronization signal burst. In some aspects, the synchronization signal block may be at least four symbol periods in length, where each symbol carries one or more of the primary synchronization signal (e.g., occupying one symbol), the secondary synchronization signal (e.g., occupying one symbol), and/or the PBCH (e.g., occupying two symbols).

In some aspects, the symbols of an synchronization signal block are consecutive, as shown in FIG. 14. In some aspects, the symbols of an synchronization signal block are non-consecutive. Similarly, in some aspects, one or more synchronization signal blocks of the synchronization signal burst may be transmitted in consecutive radio resources (e.g., consecutive symbol periods) during one or more subframes. Additionally, or alternatively, one or more synchronization signal blocks of the synchronization signal burst may be transmitted in non-consecutive radio resources.

In some aspects, the synchronization signal bursts may have a burst period, whereby the synchronization signal blocks of the synchronization signal burst are transmitted by the base station according to the burst period. In other words, the synchronization signal blocks may be repeated during each synchronization signal burst. In some aspects, the synchronization signal burst set may have a burst set periodicity, whereby the synchronization signal bursts of the synchronization signal burst set are transmitted by the base station according to the fixed burst set periodicity. In other words, the synchronization signal bursts may be repeated during each synchronization signal burst set.

The base station may transmit system information, such as SIBs on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIG. 14 is provided as an example. Other examples are possible and may differ from what was described with regard to FIG. 14.

Figure 15:
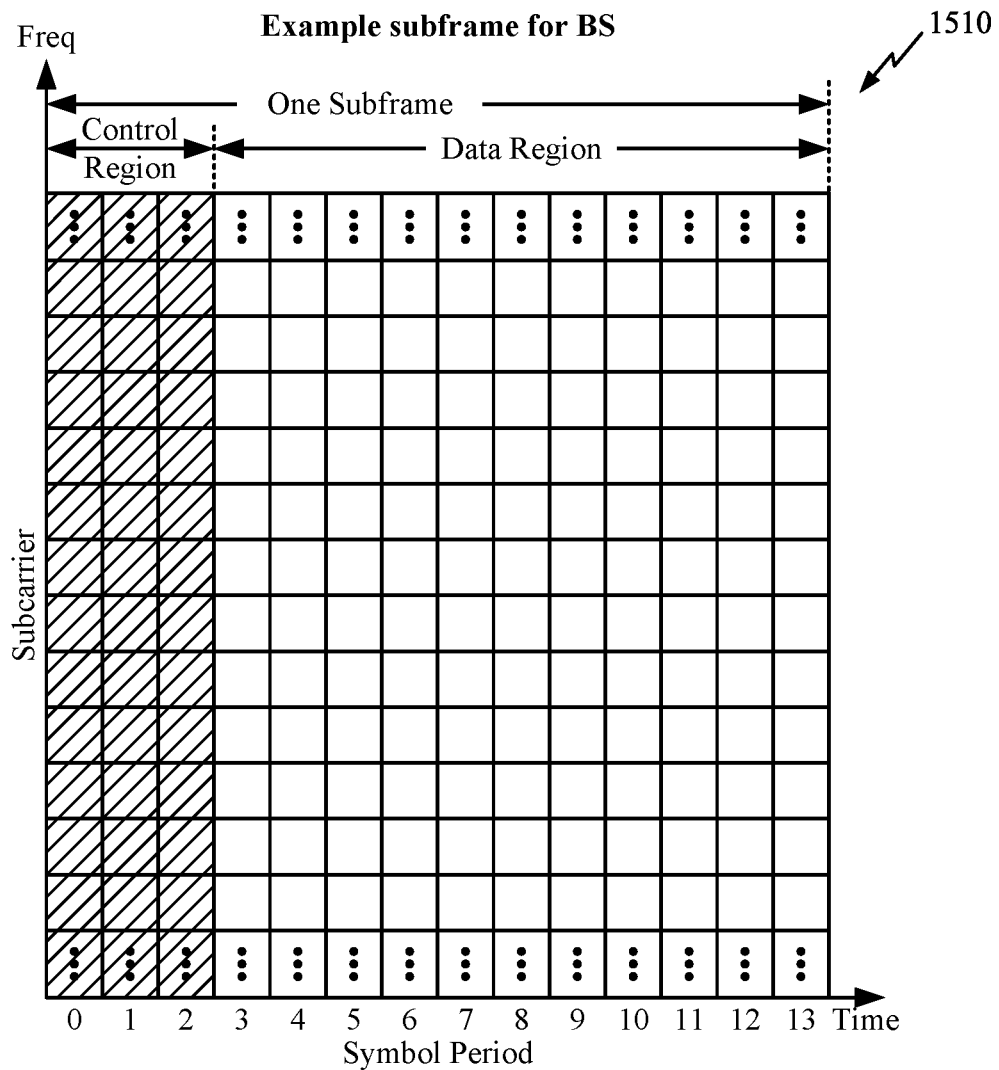
FIG. 15 illustrates an example subframe format that supports time synchronization for wireless communications in accordance with aspects of the present disclosure.

FIG. 15 illustrates an example of a subframe format 1500 that supports time synchronization for wireless communications in accordance with aspects of the present disclosure.

FIG. 15 shows an example subframe format 1510 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 1510 may be used for transmission of synchronization signal blocks that carry the primary synchronization signal, the secondary synchronization signal, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple base stations. One of these base stations may be selected to serve the UE. The serving base station may be selected based at least in part on various criteria such as received signal strength, received signal quality, path loss, and/or the like. Received signal quality may be quantified by an SINR, or an RSRQ, or some other metric. The UE may operate in a dominant interference scenario in which the UE may observe high interference from one or more interfering base stations.

While aspects of the examples described herein may be associated with NR or 5G technologies, aspects of the present disclosure may be applicable with other wireless communication systems. NR may refer to radios configured to operate according to a new air interface (e.g., other than Orthogonal Frequency Division Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-S-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported, and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

Figure 16:
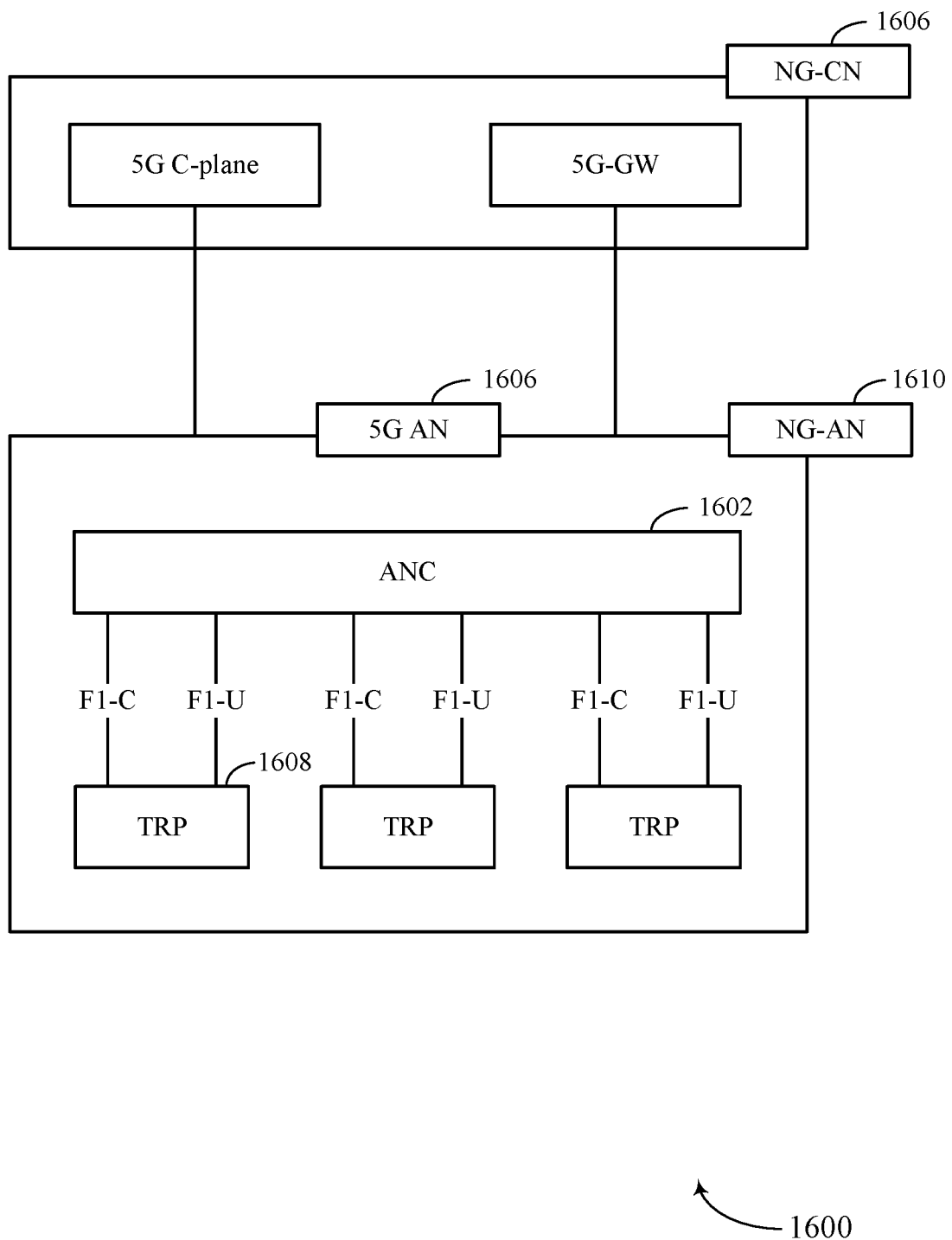
FIG. 16 illustrates an example logical architecture of a distributed radio access network (RAN) that supports time synchronization for wireless communications in accordance with aspects of the present disclosure.

FIG. 16 illustrates an example logical architecture 1600 of a distributed radio access network (RAN) that supports time synchronization for wireless communications in accordance with aspects of the present disclosure.

A 5G access node 1606 may include an ANC 1602. The ANC may be a central unit (CU) of the distributed RAN. In some cases, the ANC may be an example of a core network 130 as discussed with reference to FIG. 1. The backhaul interface to the next generation core network (NG-CN) 1604 may terminate at the ANC. The backhaul interface to neighboring next generation access nodes (NG-ANs) may terminate at the ANC. The ANC may include one or more TRPs 1608 (which may also be referred to as base stations, NR base stations, Node Bs, 5G NBs, APs, gNB, or some other term). As described herein, a TRP may be used interchangeably with "cell." The TRPs 1608 may be examples of base stations as discussed with reference to FIG. 1, FIG. 2, and FIG. 3.

The TRPs 1608 may be a distributed unit (DU). The TRPs may be connected to one ANC (ANC 1602) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The architecture may support fronthauling solutions across different deployment types. For example, the architecture may be based at least in part on transmit network capabilities (e.g., bandwidth, latency, and/or jitter). The architecture may share features and/or components with LTE. According to aspects, the NG-AN 1610 may support dual connectivity with NR. The NG-AN may share a common fronthaul for LTE and NR.

The architecture may enable cooperation between and among TRPs 1608. For example, cooperation may be preset within a TRP and/or across TRPs via the ANC 1602. According to aspects, no inter-TRP interface may be needed/present. According to some aspects, a dynamic configuration of split logical functions may be present within the logical architecture 1600. The packet data convergence protocol (PDCP), radio link control (RLC), MAC protocol may be adaptably placed at the ANC or TRP. According to various aspects, a base station may include a CU (e.g., ANC 1602) and/or one or more distributed units (e.g., one or more TRPs 1608).

As indicated above, FIG. 16 is provided merely as an example. Other examples are possible and may differ from what was described with regard to FIG. 16.

Figure 17:
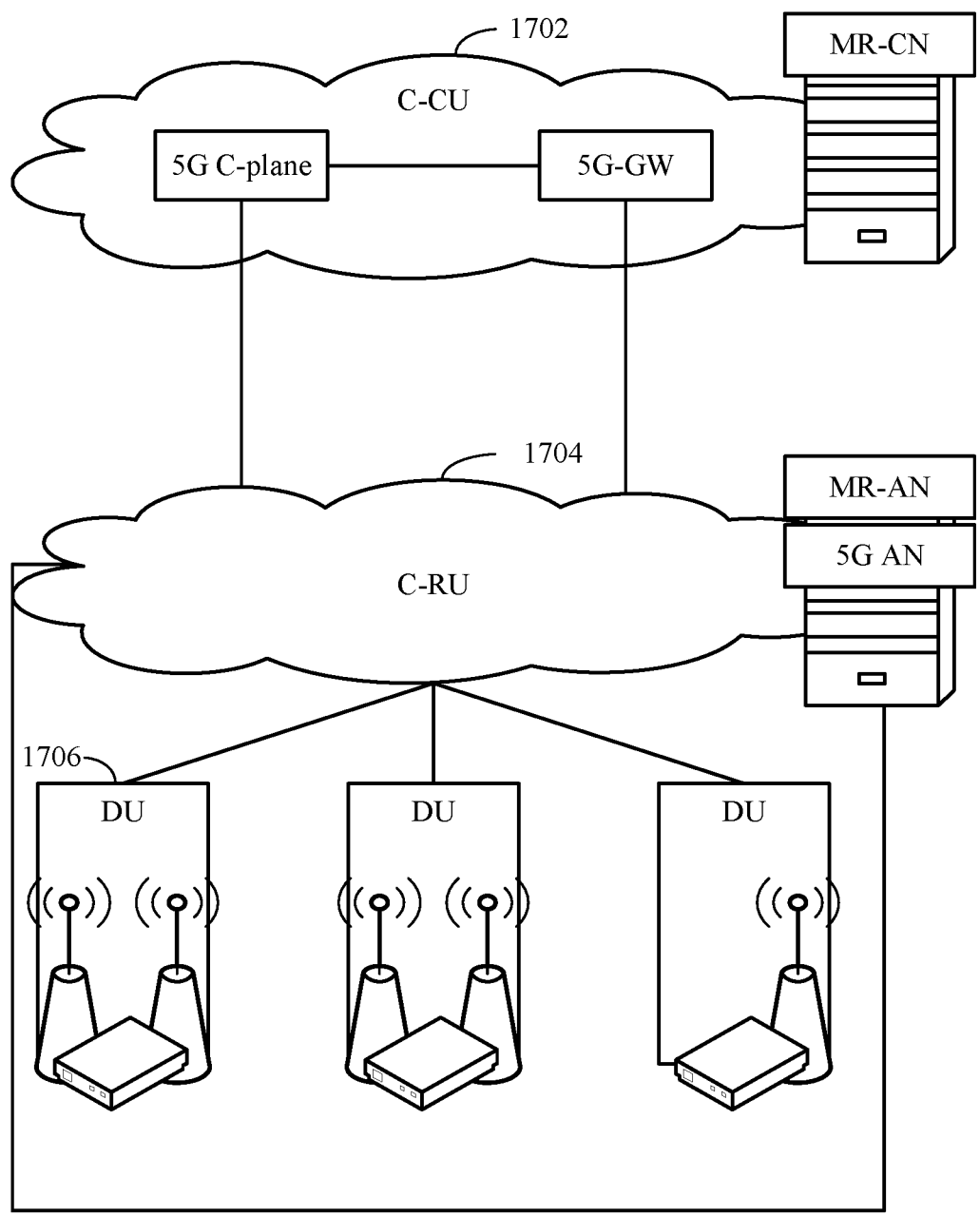
FIG. 17 illustrates an example of physical architecture of a distributed RAN that supports time synchronization for wireless communications in accordance with aspects of the present disclosure.

FIG. 17 illustrates an example physical architecture 1700 of a distributed RAN that supports time synchronization for wireless communications in accordance with aspects of the present disclosure. A centralized core network unit (C-CU) 1702 may host core network functions. In some cases, the C-CU 1702 may include aspects of the core network 130 as discussed with reference to FIG. 1. The C-CU may be centrally deployed. C-CU functionality may be offloaded (e.g., to advanced wireless services (AWS)), in an effort to handle peak capacity.

A centralized RAN unit (C-RU) 1704 may host one or more ANC functions. Optionally, the C-RU may host core network functions locally. The C-RU may have distributed deployment. The C-RU may be closer to the network edge. A DU 1706 may host one or more TRPs. The DU may be located at edges of the network with radio frequency (RF) functionality.

As indicated above, FIG. 17 is provided merely as an example. Other examples are possible and may differ from what was described with regard to FIG. 17.

Figure 18:
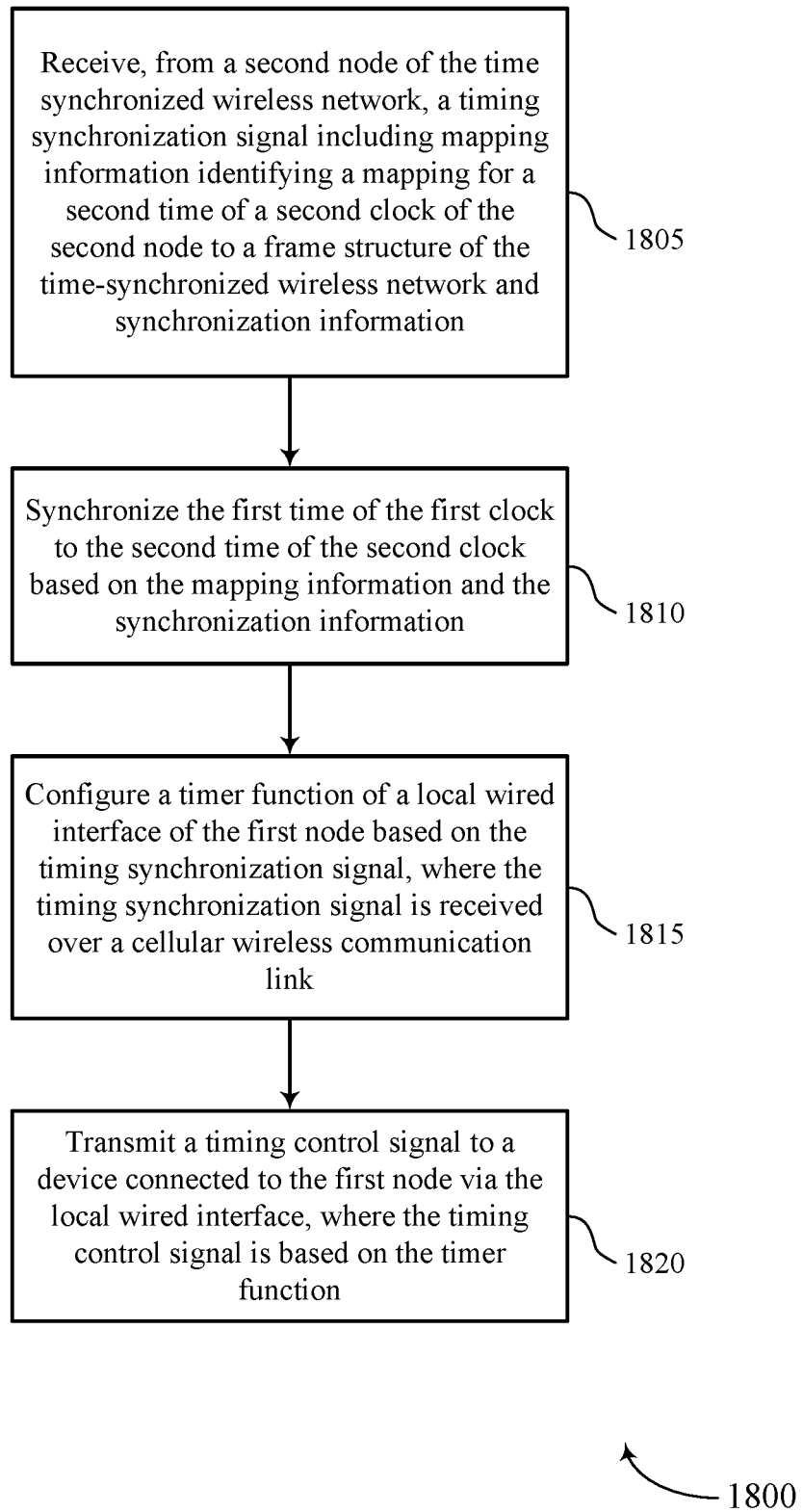
FIGS. 18 through 23 illustrate methods for time synchronization for wireless communications in accordance with aspects of the present disclosure.

FIG. 18 shows a flowchart illustrating a method 1800 that supports time synchronization for wireless communications in accordance with aspects of the present disclosure. The operations of method 1800 may be implemented by a UE 115 or base station 105 or its components as described herein. For example, the operations of method 1800 may be performed by a communication manager as described with reference to FIGS. 9 through 12. In some examples, a UE or base station may execute a set of instructions to control the functional elements of the UE or base station to perform the functions described herein. Additionally or alternatively, a UE or base station may perform aspects of the functions described herein using special-purpose hardware. In some cases, the operations of method 1800 may be performed by a first node (e.g., the UE or base station) of a time synchronized wireless network, where the first node is associated with a first clock and a first time.

At 1805, the UE or base station may receive, from a second node of the time synchronized wireless network, a timing synchronization signal including mapping information identifying a mapping for a second time of a second clock of the second node to a frame structure of the time synchronized wireless network and synchronization information. The operations of 1805 may be performed according to the methods described herein. In some examples, aspects of the operations of 1805 may be performed by a timing synchronization signal manager as described with reference to FIGS. 9 through 12.

At 1810, the UE or base station may synchronize the first time of the first clock to the second time of the second clock based on the mapping information and the synchronization information. The operations of 1810 may be performed according to the methods described herein. In some examples, aspects of the operations of 1810 may be performed by a timer function manager as described with reference to FIGS. 9 through 12.

At 1815, the UE or base station may configure a timer function of a local wired interface of the first node based on the timing synchronization signal, where the timing synchronization signal is received over a cellular wireless communication link. The operations of 1815 may be performed according to the methods described herein. In some examples, aspects of the operations of 1815 may be performed by a timer function manager as described with reference to FIGS. 9 through 12.

At 1820, the UE or base station may transmit a timing control signal to a device connected to the first node via the local wired interface, where the timing control signal is based on the timer function. The operations of 1820 may be performed according to the methods described herein. In some examples, aspects of the operations of 1820 may be performed by a timing control signal manager as described with reference to FIGS. 9 through 12.

Figure 19:
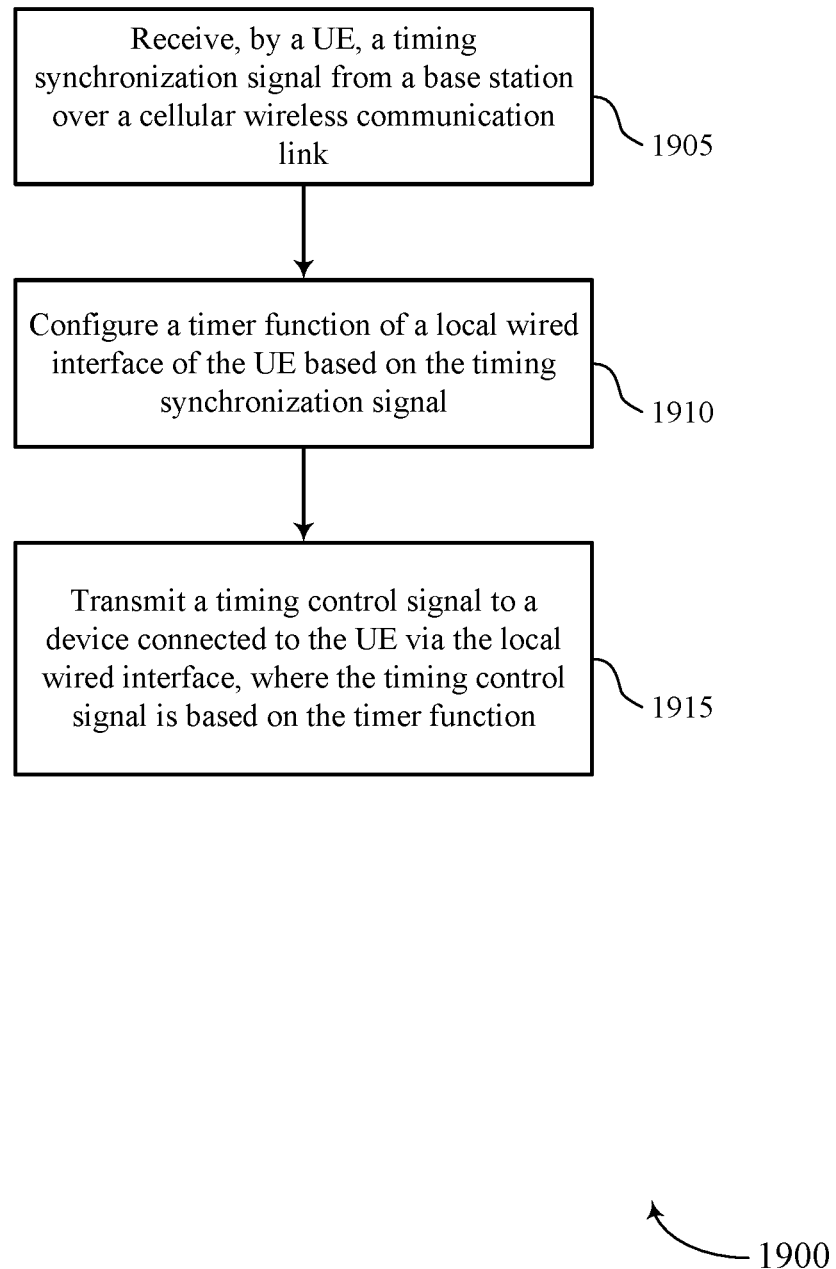

FIG. 19 shows a flowchart illustrating a method 1900 for time synchronization for wireless communications in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE 115 may execute a set of codes to control the functional elements of the device to perform the functions described herein. Additionally or alternatively, the UE 115 may perform aspects of the functions described herein using special-purpose hardware.

At 1905 the UE 115 may receive, by a UE, a timing synchronization signal from a base station over a cellular wireless communication link. The operations of 1905 may be performed according to the methods described herein. In certain examples, aspects of the operations of 1905 may be performed by a timing synchronization signal manager as described with reference to FIGS. 9 through 12.

At 1910 the UE 115 may configure a timer function of a local wired interface of the UE based at least in part on the timing synchronization signal. The operations of 1910 may be performed according to the methods described herein. In certain examples, aspects of the operations of 1910 may be performed by a timer function manager as described with reference to FIGS. 9 through 12.

At 1915 the UE 115 may transmit a timing control signal to a device connected to the UE via the local wired interface, where the timing control signal is based at least in part on the timer function. The operations of 1915 may be performed according to the methods described herein. In certain examples, aspects of the operations of 1915 may be performed by a timing control signal manager as described with reference to FIGS. 9 through 12.

Figure 20:
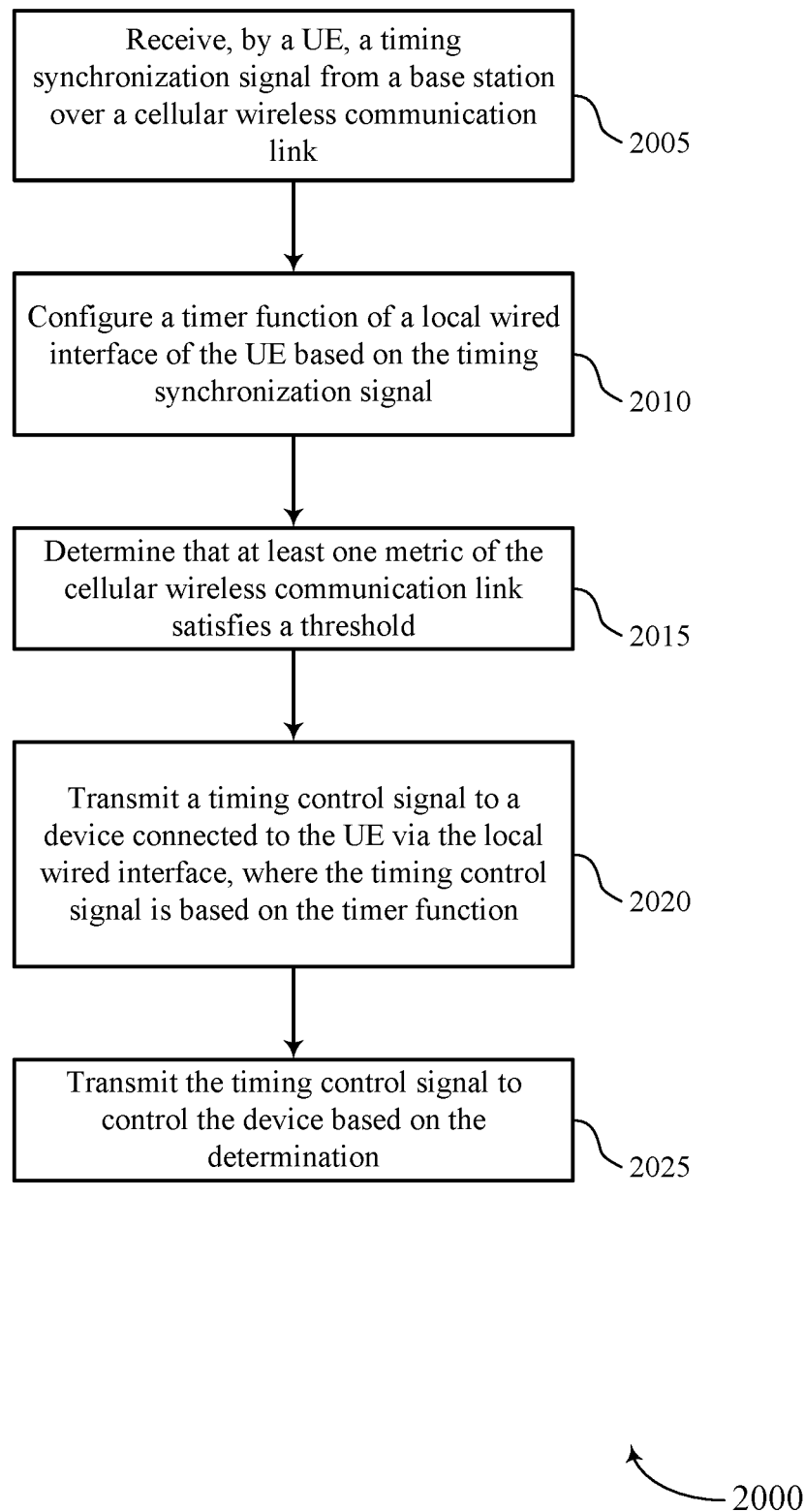

FIG. 20 shows a flowchart illustrating a method 2000 for time synchronization for wireless communications in accordance with aspects of the present disclosure. The operations of method 2000 may be implemented by a UE 115 or its components as described herein. For example, the operations of method 2000 may be performed by a communications manager as described with reference to FIGS. 9 through 12. In some examples, a UE 115 may execute a set of codes to control the functional elements of the device to perform the functions described herein. Additionally or alternatively, the UE 115 may perform aspects of the functions described herein using special-purpose hardware.

At 2005 the UE 115 may receive, by a UE, a timing synchronization signal from a base station over a cellular wireless communication link. The operations of 2005 may be performed according to the methods described herein. In certain examples, aspects of the operations of 2005 may be performed by a timing synchronization signal manager as described with reference to FIGS. 9 through 12.

At 2010 the UE 115 may configure a timer function of a local wired interface of the UE based at least in part on the timing synchronization signal. The operations of 2010 may be performed according to the methods described herein. In certain examples, aspects of the operations of 2010 may be performed by a timer function manager as described with reference to FIGS. 9 through 12.

At 2015 the UE 115 may determine that at least one metric of the cellular wireless communication link satisfies a threshold. The operations of 2015 may be performed according to the methods described herein. In certain examples, aspects of the operations of 2015 may be performed by a cellular metric manager as described with reference to FIGS. 9 through 12.

At 2020 the UE 115 may transmit a timing control signal to a device connected to the UE via the local wired interface, where the timing control signal is based at least in part on the timer function. The operations of 2020 may be performed according to the methods described herein. In certain examples, aspects of the operations of 2020 may be performed by a timing control signal manager as described with reference to FIGS. 9 through 12.

At 2025 the UE 115 may transmit the timing control signal to control the device based at least in part on the determination. The operations of 2025 may be performed according to the methods described herein. In certain examples, aspects of the operations of 2025 may be performed by a cellular metric manager as described with reference to FIGS. 9 through 12.

Figure 21:
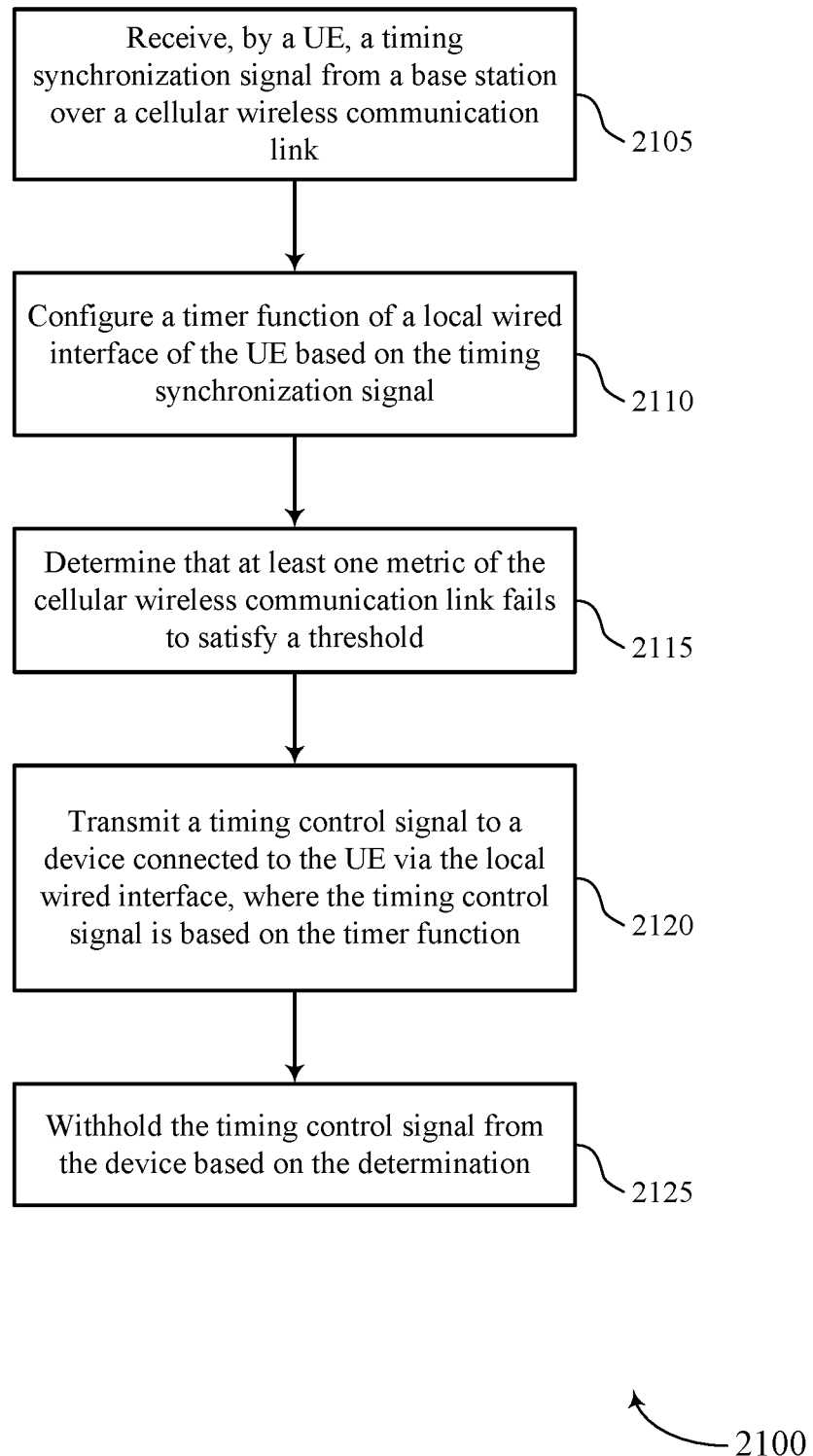

FIG. 21 shows a flowchart illustrating a method 2100 for time synchronization for wireless communications in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE 115 may execute a set of codes to control the functional elements of the device to perform the functions described herein. Additionally or alternatively, the UE 115 may perform aspects of the functions described herein using special-purpose hardware.

At 2105 the UE 115 may receive, by a UE, a timing synchronization signal from a base station over a cellular wireless communication link. The operations of 2105 may be performed according to the methods described herein. In certain examples, aspects of the operations of 2105 may be performed by a timing synchronization signal manager as described with reference to FIGS. 9 through 12.

At 2110 the UE 115 may configure a timer function of a local wired interface of the UE based at least in part on the timing synchronization signal. The operations of 2110 may be performed according to the methods described herein. In certain examples, aspects of the operations of 2110 may be performed by a timer function manager as described with reference to FIGS. 9 through 12.

At 2115 the UE 115 may determine that at least one metric of the cellular wireless communication link fails to satisfy a threshold. The operations of 2115 may be performed according to the methods described herein. In certain examples, aspects of the operations of 2115 may be performed by a cellular metric manager as described with reference to FIGS. 9 through 12.

At 2120 the UE 115 may transmit a timing control signal to a device connected to the UE via the local wired interface, where the timing control signal is based at least in part on the timer function. The operations of 2120 may be performed according to the methods described herein. In certain examples, aspects of the operations of 2120 may be performed by a timing control signal manager as described with reference to FIGS. 9 through 12.

At 2125 the UE 115 may withhold the timing control signal from the device based at least in part on the determination. The operations of 2125 may be performed according to the methods described herein. In certain examples, aspects of the operations of 2125 may be performed by a cellular metric manager as described with reference to FIGS. 9 through 12.

Figure 22:
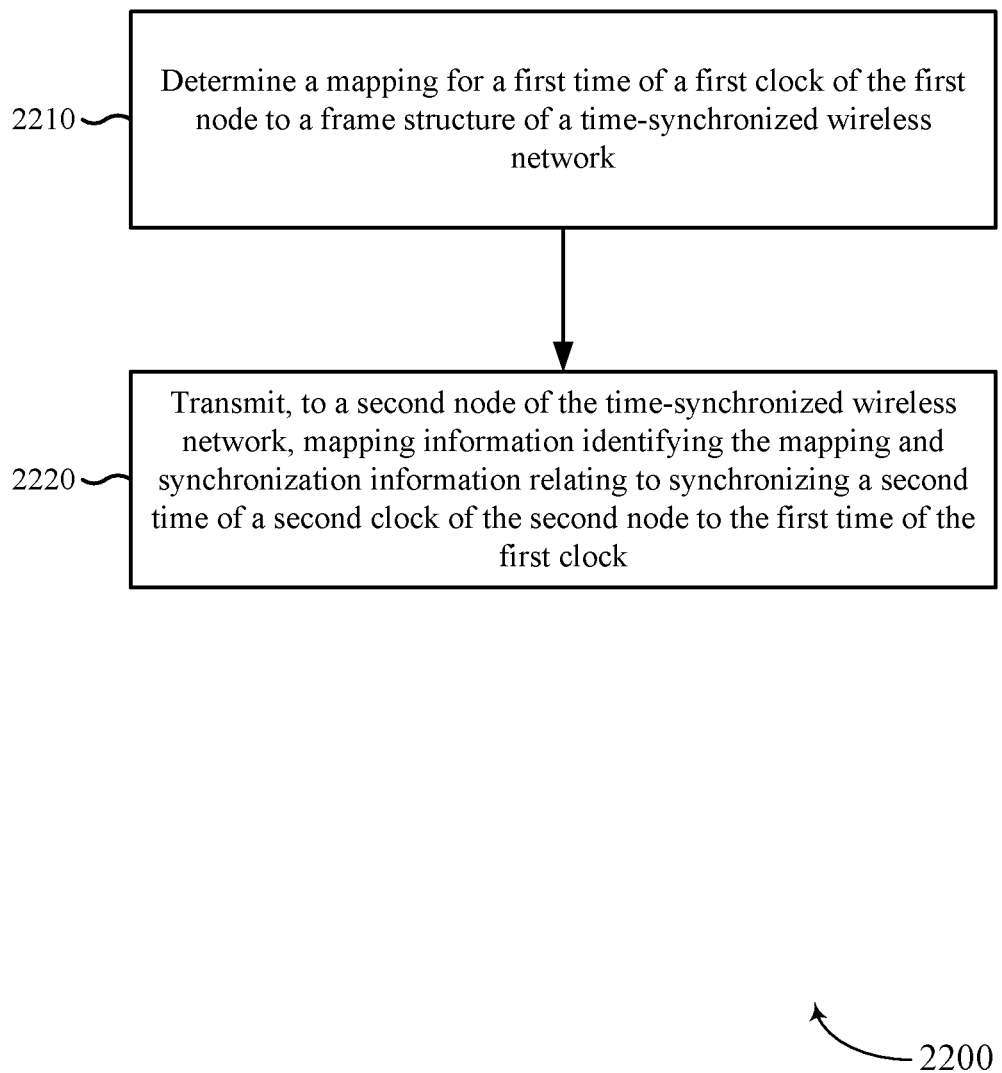

FIG. 22 shows a flowchart illustrating a method 2200 for time synchronization for wireless communications in accordance with aspects of the present disclosure. The operations of method 2200 may be implemented by a UE 115 or its components as described herein. In some other examples, the operations of method 2200 may be implemented by a base station 105 or its components as described herein.

As shown in FIG. 22, in some aspects, method 2200 may include determining a mapping (e.g., using a controller/processor of a base station, controller/processor of a UE) for a first time of a first clock of the first node to a frame structure of a time synchronized wireless network (block 2210). For example, the first node may determine the mapping for the first time of the first clock of the first node to the frame structure of a time synchronized wireless network.

As further shown in FIG. 22, in some aspects, method 2200 may include transmitting, to a second node of the time synchronized wireless network, mapping information (e.g., using a controller/processor of a base station, controller/processor of a UE) identifying the mapping and synchronization information relating to synchronizing a second time of a second clock of the second node to the first time of the first clock (block 2220). For example, the first node may transmit, to a second node of the time synchronized wireless network, mapping information identifying the mapping and synchronization information relating to synchronizing a second time of a second clock of the second node to the first time of the first clock.

Method 2200 may include additional aspects, such as any single aspect or any combination of aspects described herein.

In some aspects, the synchronization information includes a timestamp identifier associated with a reference time and a delay identifier relating to an aggregated delay associated with the reference time.

In some aspects, the synchronization information includes a protocol identifier relating to a time synchronization protocol used by the first node.

In some aspects, the time synchronization protocol includes a PTP, a generalized PTP, a timing and synchronization protocol, and/or the like.

In some aspects, the first node may receive, from a third node, a message associated with synchronizing the first time of the first clock to a third time of a third clock of the third node.

In some aspects, determining the mapping includes determining the mapping based at least in part on receiving the message associated with synchronizing the first time of the first clock to the third time of the third clock.

In some aspects, the mapping information and the synchronization information are transmitted on a downlink of a cellular link of the time synchronized wireless network or an uplink of the cellular link of the time synchronized wireless network.

In some aspects, the mapping information identifies a time value for the first time and a frame structure identifier of a frame number, a hyper frame number, a system frame number, a subframe number, and/or the like.

In some aspects, the mapping information and the synchronization information are transmitted using a control channel of a cellular interface of the time synchronized wireless network.

In some aspects, the control channel is transmitted using a control plane or a user plane of the cellular interface.

In some aspects, the transmitting includes transmitting identification information, and the identification information includes a cellular link identifier, a node identifier, a cell identifier, a radio bearer identifier, a protocol data unit session identifier, a protocol data unit connection identifier, and/or the like.

In some aspects, the mapping information and the synchronization information relate to a first time synchronization instance of a plurality of time synchronization instances associated with the first node.

Figure 23:
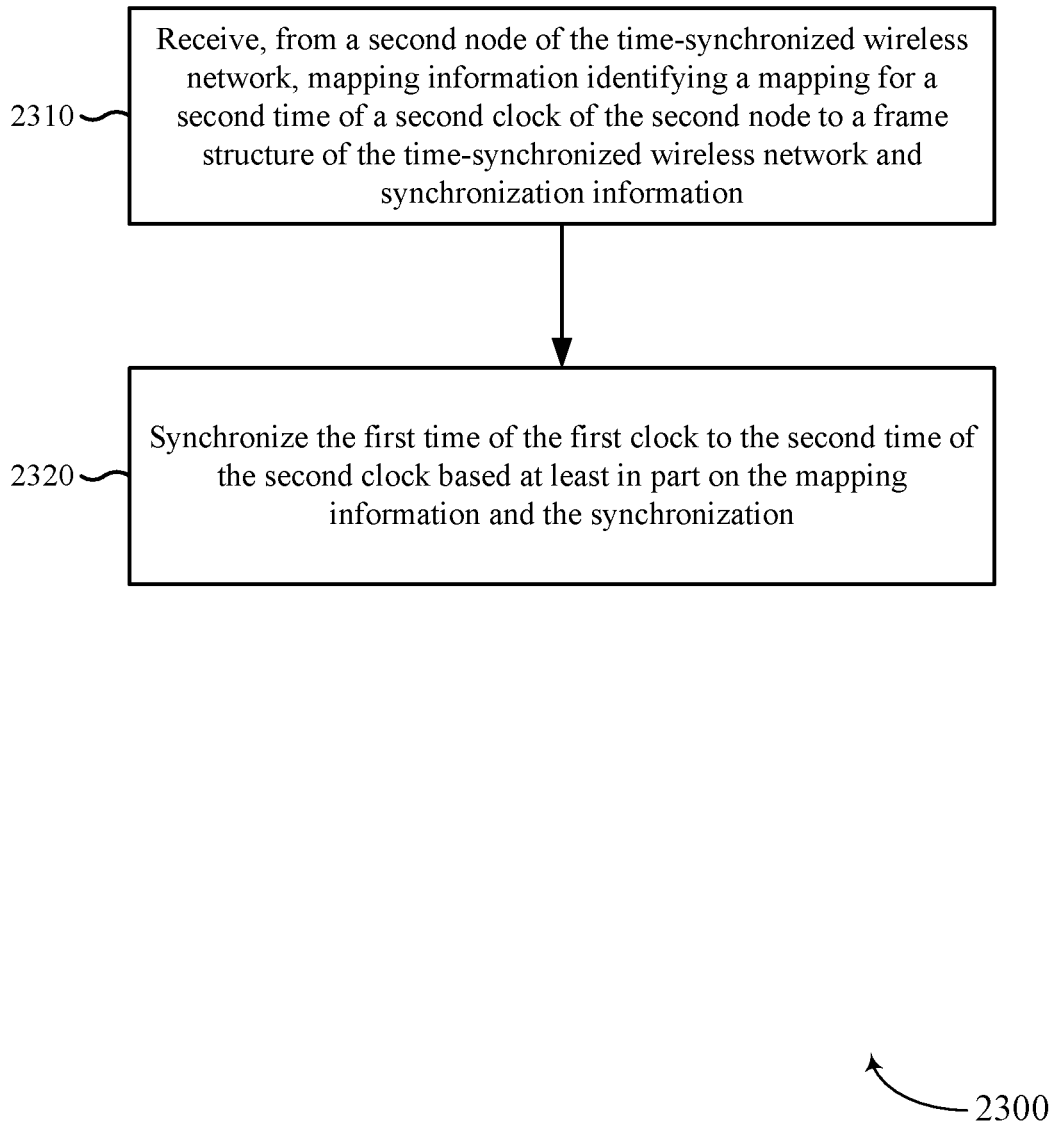

FIG. 23 shows a flowchart illustrating a method 2300 for time synchronization for wireless communications in accordance with aspects of the present disclosure. The operations of method 2200 may be implemented by a UE 115 or its components as described herein. In some other examples, the operations of method 2300 may be implemented by a base station 105 or its components as described herein.

As shown in FIG. 23, in some aspects, method 2300 may include receiving, from a second node of the time-synchronized wireless network, mapping information identifying a mapping for a second time of a second clock of the second node to a frame structure of the time-synchronized wireless network and synchronization information (block 2310). For example, the first node, of a time-synchronized wireless network and associated with a first clock with a first time, may receive (e.g., using a controller/processor of a base station, controller/processor of a UE), from the second node of the time-synchronized wireless network, mapping information identifying the mapping for the second time of the second clock of the second node to the frame structure of the time-synchronized wireless network and synchronization information.

As further shown in FIG. 23, in some aspects, method 2300 may include synchronizing the first time of the first clock to the second time of the second clock based at least in part on the mapping information and the synchronization information (block 2320). For example, the first node may synchronize (e.g., using a controller/processor of a base station, controller/processor of a UE) the first time of the first clock to the second time of the second clock based at least in part on the mapping information and the synchronization information.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, performed by a first node, of a time synchronized wireless network, associated with a first clock with a first time, comprising:
    receiving, from a second node comprising a base station of the time synchronized wireless network, a timing synchronization signal comprising mapping information identifying a mapping for a second time of a second clock to a frame structure of the time synchronized wireless network and precision time protocol (PTP) synchronization information; and
    synchronizing the first time of the first clock to the second time of the second clock based at least in part on the mapping information and the PTP synchronization information.

2. The method of claim 1, further comprising:
    configuring a timer function of a local wired interface of the first node based at least in part on the timing synchronization signal, wherein the timing synchronization signal is received over a cellular wireless communication link; and
    transmitting a timing control signal to a device connected to the first node via the local wired interface, wherein the timing control signal is based at least in part on the timer function.

3. The method of claim 2, further comprising:
    determining that at least one metric of the cellular wireless communication link satisfies a threshold; and
    transmitting the timing control signal to control the device based at least in part on the determination.

4. The method of claim 3, wherein the at least one metric of the cellular wireless communication link comprises at least one of: a reference signal received power (RSRP), a signal-to-noise ratio (SNR), a signal-to-interference-and-noise ratio (SINR), a reference signal received quality (RSRQ), a bandwidth parameter, a throughput parameter, or a combination thereof.

5. The method of claim 2, further comprising:
    determining that at least one metric of the cellular wireless communication link fails to satisfy a threshold; and
    withholding the timing control signal from the device based at least in part on the determination.

6. The method of claim 2, further comprising:
    configuring the timer function as a PTP function or a generalized PTP function.

7. The method of claim 2, wherein the device is an end device connected to the local wired interface and controlled by the first node.

8. The method of claim 1, further comprising:
    receiving the timing synchronization signal from the second node using at least one of: a primary synchronization signal, a secondary synchronization signal, a system information block, a positioning reference signal, or any combination thereof.

9. The method of claim 1, wherein the PTP synchronization information indicating the reference time and the delay associated with the reference time of the second clock comprises a timestamp identifier associated with the reference time and a delay identifier relating to an aggregated delay associated with the reference time.

10. The method of claim 1, wherein the PTP synchronization information includes a protocol identifier relating to a time synchronization protocol used by the first node.

11. The method of claim 10, wherein the time synchronization protocol includes at least one of a PTP or a generalized PTP.

12. The method of claim 1, further comprising:
transmitting the mapping information and the PTP synchronization information to a third node to synchronize a third time of a third clock of the third node to the second time of the second clock of the second node based at least in part on receiving the mapping information and the PTP synchronization information.

13. The method of claim 1, wherein the mapping information and the PTP synchronization information are received on a downlink of a cellular link of the time synchronized wireless network or an uplink of the cellular link of the time synchronized wireless network.

14. The method of claim 1, wherein the mapping information identifies a time value for the first time and a frame structure identifier of at least one of a frame number, a hyper frame number, a system frame number, or a subframe number.

15. The method of claim 1, wherein the mapping information and the PTP synchronization information are received using a control channel of a cellular interface of the time synchronized wireless network.

16. The method of claim 15, wherein the control channel is received using a control plane or a user plane of the cellular interface.

17. The method of claim 1, wherein the receiving includes receiving identification information; and
wherein the identification information includes at least one of a cellular link identifier, a node identifier, a cell identifier, a radio bearer identifier, a protocol data unit session identifier, or a protocol data unit connection identifier.

18. The method of claim 1, wherein the mapping information and the PTP synchronization information relate to a first time synchronization instance of a plurality of time synchronization instances associated with the first node.

19. An apparatus associated with a first node for wireless communication, the apparatus comprising:
a processor,
memory coupled with the processor; and
instructions stored in the memory and executable by the processor to cause the apparatus to:
receive, by the first node associated with a first clock and a first time and from a second node comprising a base station of a time synchronized wireless network, a timing synchronization signal comprising mapping information identifying a mapping for a second time of a second clock to a frame structure of the time synchronized wireless network and precision time protocol (PTP) synchronization information; and
synchronize the first time of the first clock to the second time of the second clock based at least in part on the mapping information and the PTP synchronization information.

20. The apparatus of claim 19, wherein the instructions are further executable by the processor to cause the apparatus to:
configure a timer function of a local wired interface of the first node based at least in part on the timing synchronization signal, wherein the timing synchronization signal is received over a cellular wireless communication link; and
transmit a timing control signal to a device connected to the first node via the local wired interface, wherein the timing control signal is based at least in part on the timer function.

21. The apparatus of claim 20, wherein the instructions are further executable by the processor to cause the apparatus to:
determine that at least one metric of the cellular wireless communication link satisfies a threshold; and
transmit the timing control signal to control the device based at least in part on the determination.

22. The apparatus of claim 21, wherein the at least one metric of the cellular wireless communication link comprises at least one of: comprises a reference signal received power (RSRP), a signal-to-noise ratio (SNR), a signal-to-interference-and-noise ratio (SINR), a reference signal received quality (RSRQ), a bandwidth parameter, a throughput parameter, or a combination thereof.

23. The apparatus of claim 20, wherein the instructions are further executable by the processor to cause the apparatus to:
determine that at least one metric of the cellular wireless communication link fails to satisfy a threshold; and
withhold the timing control signal from the device based at least in part on the determination.

24. The apparatus of claim 20, wherein the instructions are further executable by the processor to cause the apparatus to:
configure the timer function as a PTP function or a generalized PTP function.

25. The apparatus of claim 20, wherein the device is an end device connected to the local wired interface and controlled by the first node.

26. The apparatus of claim 19, wherein the instructions are further executable by the processor to cause the apparatus to:
receive the timing synchronization signal from the second node using at least one of: a primary synchronization signal, a secondary synchronization signal, a system information block, a positioning reference signal, or any combination thereof.

27. The apparatus of claim 19, wherein the PTP synchronization information indicating the reference time and the delay associated with the reference time of the second clock comprises a timestamp identifier associated with the reference time and a delay identifier relating to an aggregated delay associated with the reference time.

28. The apparatus of claim 19, wherein the PTP synchronization information includes a protocol identifier relating to a time synchronization protocol used by the first node.

29. The apparatus of claim 28, wherein the time synchronization protocol includes at least one of a PTP or a generalized PTP.

30. The apparatus of claim 19, wherein the instructions are further executable by the processor to cause the apparatus to:
transmit the mapping information and the PTP synchronization information to a third node to synchronize a third time of a third clock of the third node to the second time of the second clock of the second node based at least in part on receiving the mapping information and the PTP synchronization information.

31. The apparatus of claim 19, wherein the mapping information and the PTP synchronization information are received on a downlink of a cellular link of the time synchronized wireless network or an uplink of the cellular link of the time synchronized wireless network.

32. The apparatus of claim 19, wherein the mapping information identifies a time value for the first time and a frame structure identifier of at least one of a frame number, a hyper frame number, a system frame number, or a subframe number.

33. The apparatus of claim 19, wherein the mapping information and the PTP synchronization information are received using a control channel of a cellular interface of the time synchronized wireless network.

34. The apparatus of claim 33, wherein the control channel is received using a control plane or a user plane of the cellular interface.

35. The apparatus of claim 19, wherein:
the receiving includes receiving identification information; and
wherein the identification information includes at least one of a cellular link identifier, a node identifier, a cell identifier, a radio bearer identifier, a protocol data unit session identifier, or a protocol data unit connection identifier.

36. The apparatus of claim 19, wherein the mapping information and the PTP synchronization information relate to a first time synchronization instance of a plurality of time synchronization instances associated with the first node.

37. An apparatus associated with a first node for wireless communication, the apparatus comprising:
means for receiving, by the first node associated with a first clock and a first time and from a second node comprising a base station of a time synchronized wireless network, a timing synchronization signal comprising mapping information identifying a mapping for a second time of a second clock to a frame structure of the time synchronized wireless network and precision time protocol (PTP) synchronization information indicating a reference time and a delay associated with the reference time of the second clock; and
means for synchronizing the first time of the first clock to the second time of the second clock based at least in part on the mapping information and the PTP synchronization information.

38. A non-transitory computer-readable medium storing code for wireless communications, the code comprising instructions executable by a processor of a first node to:
receive, by the first node associated with a first clock and a first time and from a second node comprising a base station of a time synchronized wireless network, a timing synchronization signal comprising mapping information identifying a mapping for a second time of a second clock of the second node to a frame structure of the time synchronized wireless network and precision time protocol (PTP) synchronization information indicating a reference time and a delay associated with the reference time of the second clock; and
synchronize the first time of the first clock to the second time of the second clock based at least in part on the mapping information and the PTP synchronization information.

* * * * *